US011954287B1

(12) United States Patent
Yang et al.

(10) Patent No.: US 11,954,287 B1
(45) Date of Patent: Apr. 9, 2024

(54) SELF-CAPACITOR SENSING USING ALTERNATING-CURRENT-MODE BRIDGE WITH GLOBAL CURRENT ROTATION FOR CAPACITIVE TOUCH PANELS

(71) Applicant: Shenzhen Goodix Technology Co., Ltd., Shenzhen (CN)

(72) Inventors: Chao Yang, San Diego, CA (US); Mohamed Elsayed, San Diego, CA (US); Dazhi Wei, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/306,203

(22) Filed: Apr. 24, 2023

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05)

(58) Field of Classification Search
CPC ........ G06F 3/0412; G06F 3/041; G06F 3/044; G06F 3/0416; G06F 3/04166; G06F 3/0418; G06F 3/04182; G06F 3/0443
See application file for complete search history.

(56) References Cited

U.S. PATENT DOCUMENTS

| | | | |
|---|---|---|---|
| 11,435,864 B1 * | 9/2022 | Van Ostrand | G06F 3/0412 |
| 2021/0389354 A1 * | 12/2021 | Huynh | G01R 19/257 |

* cited by examiner

*Primary Examiner* — Koosha Sharifi-Tafreshi
(74) *Attorney, Agent, or Firm* — Kilpatrick Townsend & Stockton LLP

(57) ABSTRACT

Techniques are described for using a multi-branch AC-mode bridge approach with global current rotation for self-capacitor sensing in a capacitive touch panel, such as integrated into a display of a touchscreen electronic device. K channels are coupled with K branches of a multi-branch AC-mode bridge to form K−1 pairs of channels for concurrent differential readout. K nominally identical sinusoidal input currents are generated based on an error signal, which is generated based on comparing a sinusoidal driver signal with feedback from one or more of the K branches. A unit current rotator rotates the K sinusoidal input currents to each of the branches, so that each branch current is formed by a rotating contribution from each of the sinusoidal input currents. Driving each branch with its branch current manifests a respective branch voltage, and differences between the branch voltages can be used to differentially sense pairs of channels.

20 Claims, 15 Drawing Sheets

SELF-CAPACITOR SENSING USING ALTERNATING-CURRENT-MODE BRIDGE WITH GLOBAL CURRENT ROTATION FOR CAPACITIVE TOUCH PANELS

TECHNICAL FIELD

The present document relates to sensing circuits, and, more particularly, to continuous-time self-capacitor sensing approaches utilizing an alternating-current-mode bridge with global current rotation, such as for use in large capacitive touch panels.

BACKGROUND

Many modern electronics applications include integrated touch panels, such as touchscreen displays. Typically, touch-sensing layers of a touchscreen display use capacitive sensing to determine when and where a user is touching the display. Display noise can couple into the touch-sensing layers, which can manifest as noise in the readout of capacitive touch-sensing information. Over time, there has tended to be a continuing increase in such display noise coupling, and it has become increasingly challenging to provide sufficiently low-noise read-out circuits for such applications.

Often, the touch-sensing layers of the display include an array of "mutual capacitors" and "self-capacitors." For example, there is a self-capacitor for each row and for each column of the array, and there is a mutual capacitor at each row-column intersection of the array. The mutual capacitors in the touch panel tend to be the primary sensing elements because they tend to provide more accurate information regarding touch (e.g., finger) locations. Still, self-capacitor sensing can provide a useful alternative (or supplemental) source of touch-sensing information, especially for cases in which mutual-capacitor sensing tends to be inaccurate (e.g., when a user has wet fingers).

However, self-capacitor sensing can be more challenge, due to smaller signal levels than those obtained with mutual capacitor sensing. The change in capacitance induced in a self-capacitor during a touch even may typically be only a small fractional of its base capacitance value. The self-capacitor sensitivity can be reduced even further as the display size increases. Reliably sensing such small changes in capacitance can involve designing very high-performance sensing circuits.

BRIEF SUMMARY

Embodiments disclosed herein include systems and methods for using a multi-branch AC-mode bridge approach with global current rotation for self-capacitor sensing in a capacitive touch panel, such as integrated into a display of a touchscreen electronic device. For example, a touch panel array is integrated with a display panel and has multiple touch sense channels. Each channel has a respective channel self-capacitance (Ci) that includes a respective base self-capacitance (Cs) corresponding to display noise capacitively coupled onto the channel from the display panel and a respective touch capacitance (Ctouch) that changes responsive to presence of a touch event local to the channel. K channels are coupled with K branches of a multi-branch AC-mode bridge to form K-1 pairs of channels for concurrent differential readout. K nominally identical current sources generate K nominally identical sinusoidal input currents based on an error signal, and the error signal is generated based on comparing a sinusoidal driver signal with feedback from one or more of the K branches. A unit current rotator rotates the K sinusoidal input currents to each of the branches, so that each branch current is formed by a rotating contribution from each of the sinusoidal input currents. Driving each branch with its branch current manifests a respective branch voltage, and differences between the branch voltages can be used to differentially sense pairs of channels.

According to a first set of embodiments, a multi-branch alternating-current-mode (AC-mode) bridge for self-capacitor sensing. The multi-branch AC-mode bridge includes: K branches, each to couple with a respective one of a plurality of touch sense channels of a touch panel array integrated with a display panel, K being an integer greater than two; K adjustable current sources, each to output a respective one of K sinusoidal input currents based on an error signal; a unit current rotator having K rotator inputs and K rotator outputs, each of the K rotator inputs coupled with a respective one of the K sinusoidal input currents, each of the K rotator outputs coupled with a respective one of the K branches, the unit current rotator configured to cycle repeatedly through a sequence of K frames of a rotation cycle, each frame defining a unique set of one-to-one couplings between the K rotator outputs and the K rotator inputs, such that each of the K branches receives a respective sinusoidal branch current that is sourced by each of the K sinusoidal input currents for 1/Kth of each rotation cycle; and an error amplifier to generate the error signal responsive to a sinusoidal driver signal and a channel feedback signal, wherein each of the K branches manifests a respective branch voltage responsive to its respective sinusoidal branch current, and the channel feedback signal is based on the respective branch voltage from one or more of the K branches.

According to another set of embodiments, a method is provided for self-capacitor sensing in a touch panel array integrated with a display panel. The method includes: generating an error signal responsive to a sinusoidal driver signal and a channel feedback signal; generating K sinusoidal input currents based on the error signal, the K sinusoidal input currents being nominally identical, K being an integer greater than two; for each of a plurality of rotation cycles, cycling through K frames by, for each kth frame: sequencing a unit current rotator into a kth configuration of K configurations, each configuration defining a unique one-to-one coupling between K rotator inputs of the unit current rotator and K rotator outputs of the unit current rotator, wherein each of the K rotator inputs is coupled with a respective one of the K sinusoidal input currents, and each of the K rotator outputs is coupled with a respective one of K branches, each of the K branches to couple with a respective one of a plurality of touch sense channels of the touch panel array, such that each of the K branches receives a respective sinusoidal branch current that is sourced by each of the K sinusoidal input currents for 1/Kth of each rotation cycle; and updating the channel feedback signal based on one or more respective branch voltages from one or more of the K branches, the one or more respective branch voltages arising on the one or more of the K branches responsive to the respective sinusoidal branch current on the one or more of the K branches.

The drawings, the description and the claims below provide a more detailed description of the above, their implementations, and features of the disclosed technology.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Many modern electronics applications include integrated touch panels, such as touchscreen displays. Typically, touch-sensing layers of a touchscreen display use capacitive sensing to determine when and where a user is touching the display. Display noise can couple into the touch-sensing layers, which can manifest as noise in the readout of capacitive touch-sensing information. Over time, there has tended to be a continuing increase in such display noise coupling, and it has become increasingly challenging to provide sufficiently high-performance read-out circuits for such applications.

Figure 1:
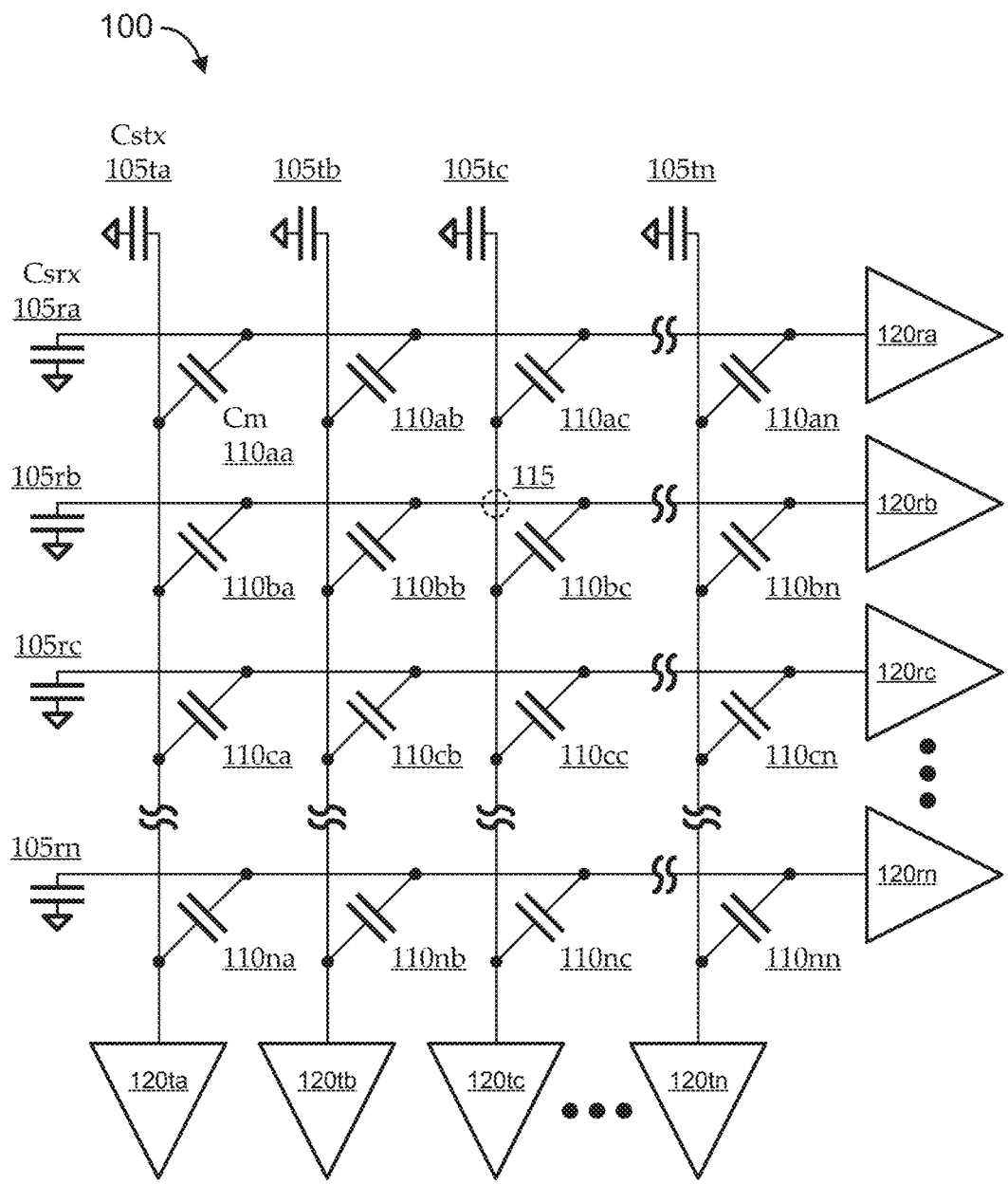
FIG. 1 shows a simplified portion of an illustrative touch panel array having rows and columns.

FIG. 1 shows a simplified portion of an illustrative touch panel array 100 having rows and columns. In general, the touch panel array 100 is configured to sense when and where a user touches the array by sensing a change in capacitance and associating the sensed change to a particular row-column intersection location. A "mutual capacitor" (Cm) 110 (illustrated as 110aa-110nn) is located at each row-column intersection location. Additionally, each row and each column of the array 100 is coupled with a respective "self-capacitor" (Cs) 105 (illustrated as Csrx 105ra-105rn and Cstx 105ta-105tn). The row-wise self-capacitors are labeled "Csrx", and the column-wise self-capacitors are labeled "Cstx."

As used herein, a touch event is considered as any touch interaction with the touch panel array 215 that is detectable by any one or more of the touch sense circuits 120. A touch event is considered herein to be "local" to a particular row or column line when the touch event is sufficiently proximate to the particular row or column line so as to manifest as a change in capacitance (mutual capacitance and/or self-capacitance) that is detectable by at least the touch sense circuit 120 coupled with that particular row or column line. Correspondingly, a touch event is considered herein to be local to a particular self-capacitor 105 when the touch event is sufficiently proximate to the particular row or column line coupled with the self-capacitor 105 so as to manifest as a change in self-capacitance that is detectable by at least the touch sense circuit 120 coupled with the particular row or column line; and a touch event is considered herein to be local to a particular mutual capacitor 110 when the touch event is sufficiently proximate to the mutual capacitor 110 so as to manifest as a change in mutual-capacitance that is detectable by at least the touch sense circuit 120 receiving the signal driven through the mutual capacitor 110. Similarly, a touch event is considered herein to be local to a particular touch sense circuit 120 when the touch event is sufficiently proximate to any portion of the touch panel array 100 so as to manifest as a change in mutual-capacitance and/or self-capacitance that is detectable by at least the particular touch sense circuit 120.

For example, a touch event occurring (e.g., a finger being placed) at the circled row-column intersection location 115 can cause a detectable change in capacitance relating to mutual capacitor 110bc, row-wise self-capacitor 105rb, and column-wise self-capacitor 105tc. As such, the touch event can be considered as local to at least: the third column line, the second row line, row-wise self-capacitor 105rb, column-wise self-capacitor 105tc, mutual capacitor 110bc, touch sense circuit 120rb, and touch sense circuit 120tc. In some cases, the same touch event may be local to (i.e., and therefore detectable in relation to) multiple adjacent row lines, column lines, self-capacitors 105 and/or mutual capacitors 110.

Although not explicitly shown as such, the touch panel array 100 can be integrated as part of a display, such as a touchscreen display of an electronic device. The grid of row lines and column lines effectively provides a number of touch sense channels. The mutual capacitors 110 in the touch panel array 100 tend to be the primary sensing elements because they tend to provide more accurate information regarding touch (e.g., finger) locations. Mutual capacitance of one of the mutual capacitors 110 is typically measured by driving a signal through the column and row lines coupled with the mutual capacitor 110, and measuring the output. For example, measuring the capacitance of mutual capacitor 110*bc* can involve coupling a driver (not shown) with the column line corresponding to column-wise self-capacitor 105*tc*. The driver can transmit a signal through the column line, and the signal is coupled, via mutual capacitor 110*bc*, onto the row line corresponding to row-wise self-capacitor 105*rb*. The signal can then be received at a touch sense circuit 120*rb* coupled with the row line, and measured to detect any change in capacitance indicating presence of a touch event at the mutual capacitor 110*bc*.

In addition to mutual-capacitor 110 sensing, self-capacitor 105 sensing can provide a useful alternative (or supplemental) source of touch-sensing information, especially for cases in which mutual-capacitor 110 sensing tends to be inaccurate (e.g., when a user has wet fingers). Although the self-capacitors 105 are illustrated in FIG. 1 as discrete devices, each self-capacitor 105 represents an aggregate parasitic capacitance over the corresponding row line or column line with illustrated as coupled with the self-capacitor 105 is coupled. For example, as noted above, the touch panel array 100 can be integrated with a display, and the parasitic capacitance of the self-capacitors 105 can manifest from capacitively coupled display noise. Measuring the self-capacitors 105 typically does not involve driving a signal through row or column lines of the touch panel array 100. Rather, as illustrated in FIG. 1, each row line and each column line is coupled with a respective touch sense circuit 120 (illustrated as touch sense circuits 120*ra*-120*rn* for the row-lines and as touch sense circuits 120*ta*-120*tn* for the column lines). As described herein, a touch event proximate to a particular row or column line can manifest as a change in self-capacitance sense by the touch sense circuit 120 coupled with that row or column line.

Figure 2:
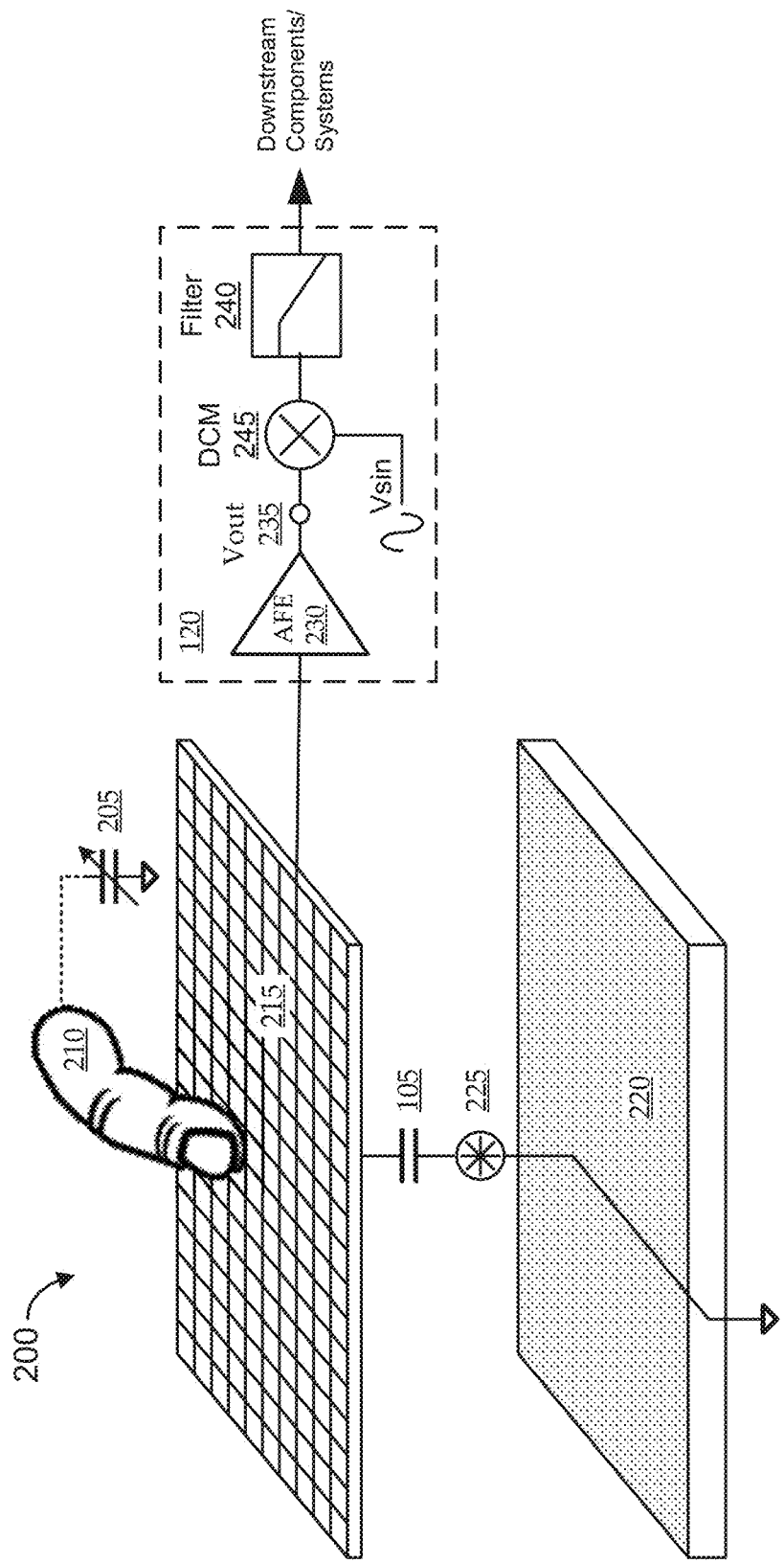
FIG. 2 shows a simplified portion of a touch sensing environment to further illustrate self-capacitor sensing.

FIG. 2 shows a simplified portion of a touch sensing environment 200 to further illustrate self-capacitor sensing. The illustrated environment shows a touch panel array 215 (e.g., implemented by touch panel array 100 of FIG. 1) integrated with a display panel 220. Typically, a common cathode layer (e.g., which can be considered as a local ground plane) of the display panel 220 faces the touch panel array 215. Capacitively coupled display noise 225 from the display panel 220 manifests at the touch panel array 215 as self-capacitance (i.e., a parasitic capacitance) on the row and column lines of the touch panel array 215, which can be represented (e.g., as in FIG. 1) as self-capacitors 105 coupled with those row and column lines. Only one self-capacitor 105 is shown to avoid over-complicating the figure.

As discussed with reference to FIG. 1, each row and column line can be coupled with a respective touch sense circuit 120 (only one is shown). Embodiments of the touch sense circuit 120 typically include an analog front-end (AFE) 230 that generates a channel sense output voltage (Vout) 235. It can be desirable to include an up-converting stage in the AFE 230 to up-convert the input (direct-current, DC) signal to a higher frequency to help eliminate AFE low-frequency noise. The AFE 230 path then includes a subsequent down-converting mixer (DCM) 245 to move the signal back to DC. A filter 240 after the DCM 245 can help keep the DC signal, while eliminating higher frequency spurs. For example, without up-conversion, the output of the AFE 230 is typically a DC magnitude (e.g., resulting from an average magnitude over a series of single-polarity pulses). The up-converting stage can result in the output of the AFE 230 being a series of pulses with alternating polarity, so that the detected signal is represented as a magnitude at a particular frequency (i.e., not DC, and with low-frequency noise effectively removed). The DCM 245 can then mix the AFE 230 output with a sinusoid of the same frequency to produce a DC output signal corresponding to the DC input signal.

When there is no touch event local to the touch sense circuit 120, the touch sense circuit 120 is configured to generate the Vout 235 based on a channel capacitance corresponding to a base capacitance value of the corresponding self-capacitor 105. When a touch event is present, the amount of self-capacitance manifest by self-capacitor 105 changes. For example, as illustrated, a finger 210 touching the touch panel array 215 can manifest as a touch capacitance 205 providing a parallel capacitive path to ground. This can effectively increase the apparent self-capacitance of any self-capacitors 105 local to the touch event. Accordingly, the touch sense circuit 120 is configured to generate the Vout 235 based on an increased channel capacitance corresponding to the base capacitance value of the corresponding self-capacitor 105 plus the additional parallel capacitance provided by the touch event (i.e., channel capacitance=Cs 105+Ctouch 205).

While this type of self-capacitor 105 sensing can be effective, it can tend to be more challenge than mutual-capacitor 110 sensing at least because self-capacitor sensing tends involve much smaller signal levels than those obtained with mutual capacitor 110 sensing. The change in capacitance induced in a self-capacitor 105 during a local touch even may typically be only a small fractional of its base capacitance value. For example, there may typically be less than a 0.1-percent difference in measured capacitance between a touch and a non-touch condition. To reliably sense such a small change in capacitance, sensing circuits can be designed to effectively cancel the base capacitance value with very low read-out noise.

Figure 3:
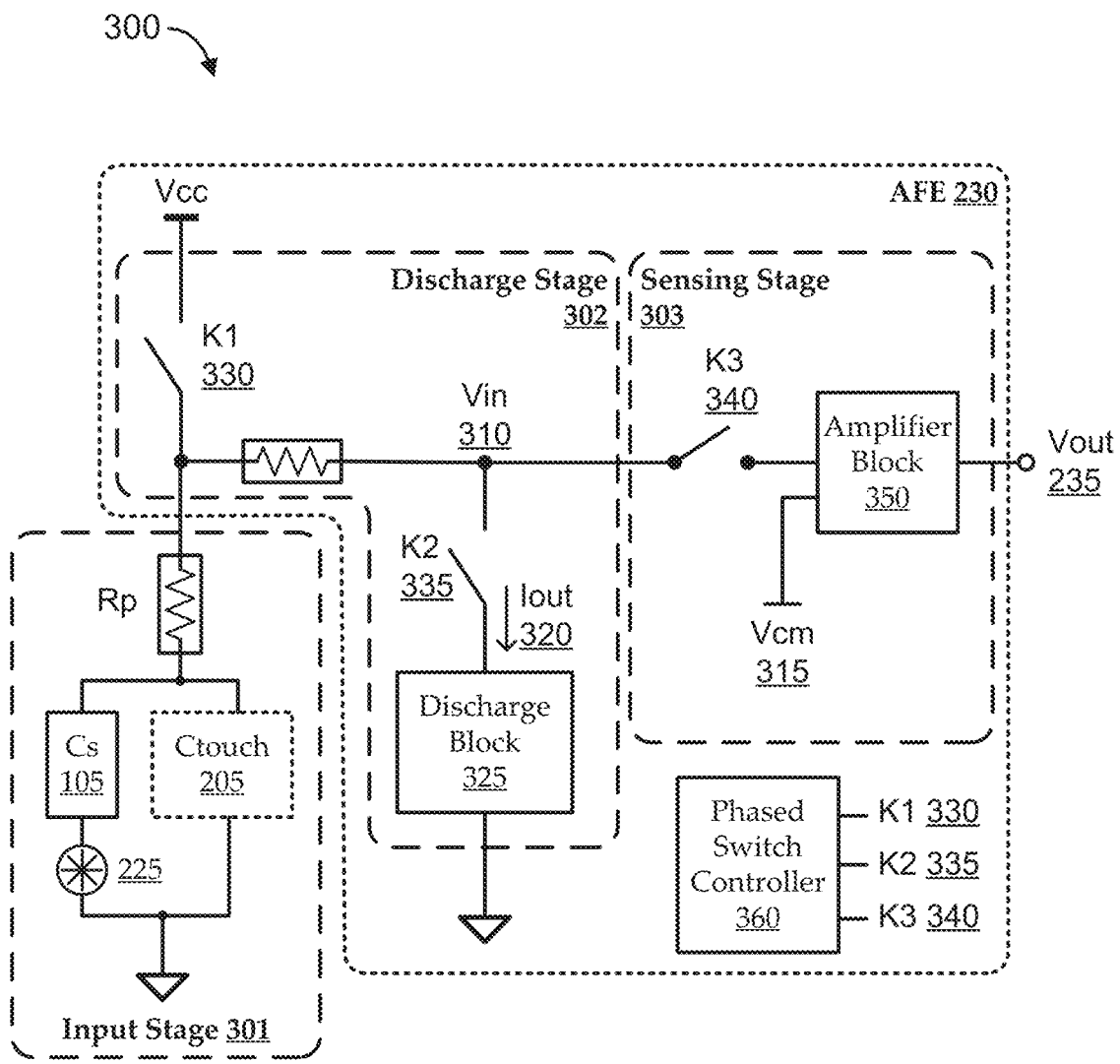
FIG. 3 shows a high-level block diagram of a self-capacitor sensing environment for discrete-time sensing.

FIG. 3 shows a high-level block diagram of a self-capacitor sensing environment 300 for discrete-time sensing. The environment 300 generally includes an input stage 301, a discharge stage 302, and a sensing stage 303. The input stage 301 can represent a particular row line or column line (channel) of a touch panel array (e.g., touch panel array 100 of FIG. 1, touch panel array 215 of FIG. 2, etc.) as seen at the input of a coupled touch sense circuit 120. As described in FIG. 2, the input to the touch sense circuit 120 can be an AFE 230, which can be implemented as the discharge stage 302 and the sensing stage 303 (i.e., as used herein, the AFE 230 is considered to include both the discharge stage 302 and the sensing stage 303). Although particular components are illustrated in particular arrangements and/or stages for the sake of clarity, alternate embodiments can rearrange and/or regroup components without departing from the scope of embodiments described herein.

Input stage 301 represents a particular channel of a capacitive touch sense array, as seen by the AFE 230. As described above, a base capacitance of a self-capacitor 105 for a channel corresponds to capacitively coupled display noise 225 from an integrated display panel. The total self-capacitance of the channel (Ci) can be represented simplistically as the self-capacitor 105 in parallel with a touch capacitance 205 (i.e., Ci=Cs+Ctouch). The amount of added touch capacitance 205 can be zero in absence of any touch event local to the self-capacitor 105, or some detectable (e.g., Ctouch>0) value in presence of a touch event local to the self-capacitor 105. The input stage 301 is further illustrated as having an impedance, as represented in FIG. 3 by resistors. The output of the input stage 301 can manifest as an input voltage level at an input voltage node (Vin) 310 of the AFE 230.

Figure 4:
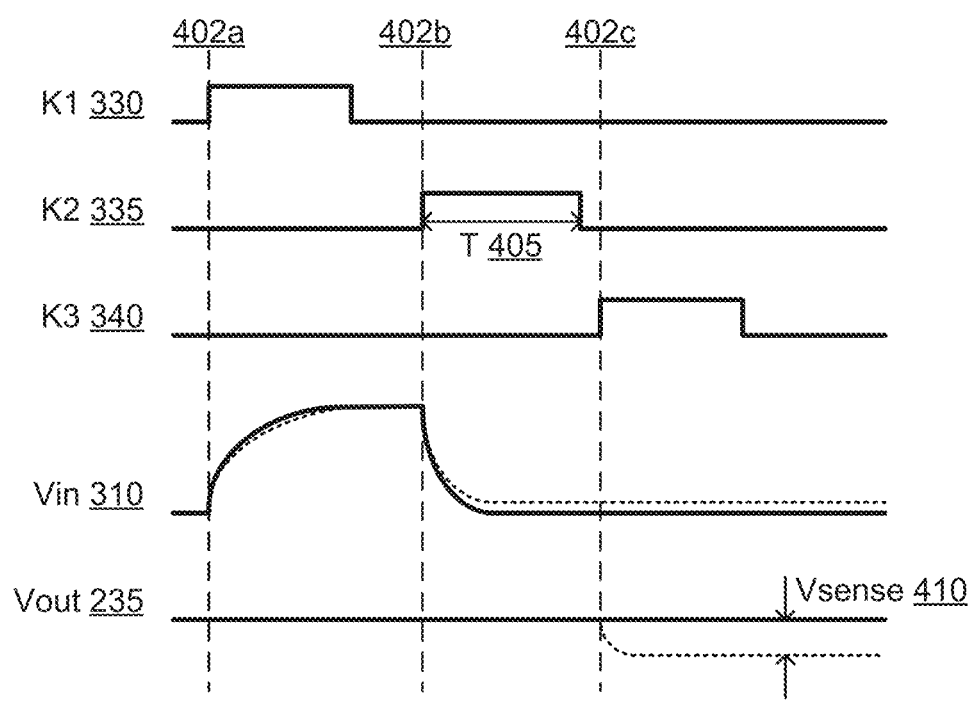
FIG. 4 shows simplified illustrative waveforms and timing at the three phases of operation.

Operation of the stages of FIG. 3 generally follows three phases corresponding to timing of three switches, K1 330, K2 335, and K3 340. The timing of the phases is controlled by a phased switch controller 360. To provide added clarity to the description of FIG. 3, FIG. 4 shows simplified illustrative waveforms and timing at the three phases 402 of operation. Signals used to control particular switches are labeled using the labels of the switches (e.g., the signal labeled "K1 330" in FIG. 4 is the signal used to control switch K1 330 in FIG. 3).

In a first phase 402a, K1 330 is closed for a charging time. As illustrated in FIG. 3, closing K1 330 couples the capacitive input 301 to a source voltage (Vcc) through a resistor (Rp), thereby charging the channel self-capacitance (Ci). Closing K1 330 also effectively couples Vin 310 with Vcc (e.g., via an input impedance, as illustrated), such that the voltage drop between Vin 310 and ground across the capacitive input 301 in series with Rp 307 increases to Vcc (or to some predetermined level below Vcc based on the input impedance) in the first phase 402a. After Ci is charged, K1 330 is opened. FIG. 4 shows an illustrative plot of Vin 310 charging up to the fully charged voltage level. A thicker solid line indicates behavior of Vin 310 in absence of a touch event (Ci=Cs), and a thinner dashed line indicates behavior of Vin 310 in presence of a touch event (Ci=Cs+Ctouch).

In a second phase 402b, K2 335 is closed for a predetermined discharge time (T) 405 (both K1 330 and K3 340 are open). The predetermined discharge time (T) 405 is also referred to herein as a "discrete discharge time," and the self-capacitive sensing approaches described herein can be considered as types of discrete-time sensing approaches, accordingly. As illustrated in FIG. 3, closing K2 335 couples Vin 310 with a discharge block 325. The voltage across Ci and Rp (i.e., relating to Vin 310) is discharged for the predetermined amount of time by a discharge current (Iout) 320, as provided by discharge block 325. The rate of discharge through the discharge block 325 is inversely related to the Ci. As such, the difference in Ci between presence of a local touch event and absence of a local touch event yields a difference in discharge rate through discharge block 325. The illustrative plot of Vin 310 in FIG. 4 shows this effect. The discharging as manifest at Vin 310 is slower in presence of a local touch event (dashed line) than in absence of a local touch event (solid line), due to the increased capacitance of Ci coming from the additional Ctouch 205 when there is a local touch event. The components (at least of the discharge stage 302) are configured to draw a certain amount of charge from Vin 310 so that, at the end of T 405 (i.e., after a discrete discharge time): Vin has been reduced to a discharge reference level (Vcm) 315 in absence of a local touch event (i.e., when Ci=Cs); or Vin has been reduced to a level that is detectably different from (e.g., above) Vcm 315 in presence of a local touch event. Thus, after T 405, when K2 335 is opened, the remaining charge on Ci (and the corresponding level of Vin 310) is detectably different between touch event and non-touch event conditions.

In a third phase 402c, K3 340 is opened (with K1 330 and K2 335 closed). As illustrated in FIG. 3, closing K3 340 couples Vin 310 with an amplifier block 350. The amplifier block 350 is configured to amplify the difference in Vin 310 between touch event and non-touch event conditions, so that the difference can be read out as a reliably detectable difference in channel sense output voltage (Vout) 235 output by the AFE 230. An illustrative plot of Vout 235 is shown in FIG. 4, and an illustrative difference in Vout 235 between the touch event and non-touch event conditions is labeled as Vsense 410. For a typical amplifier block 350 having gain ($\alpha$), Vout 235 can be expressed as:

$$V_{out} = \alpha \frac{(V_{CC} - V_{CM})C_{touch}}{C_S + C_{touch}}.$$

In some implementations, the amplifier block 350 compares Vin 310 with discharge reference level (Vcm) 315. For example, as described above, parameters (e.g., T 405, Iout 320, etc.) are set so that, Vin 235 decays to a level substantially equal to Vcm 315 in the second phase 402b in absence of a local touch event, or Vin 310 decays to a level detectably different from (e.g., greater than) Vcm 315 in presence of a local touch event. For a capacitor, it is known that the capacitor current (Ic) is related to its capacitance and change in voltage over time: Ic=C*(dV/dt). In context of this example implementation, the relationship can be reformulated as: Id*T=(Vcc−Vcm)*Cs. The amplifier block 350 can amplify a difference between Vin 310 and Vcm 315 in the third phase 402c, so that the generated Vout 235 is substantially zero in absence of a touch event (where Vin≈Vcm), or the generated Vout 235 manifests a non-zero Vsense 410 level in presence of a touch event (where Vin>Vcm).

As illustrated, embodiments can include, or can be in communication with, a phased switch controller 360. The phased switch controller 360 can output control signals to set the state of switches, such as K1 330, K2 335, and K3 340. For example, the switches can be transistors, and the control signals can be used to turn the transistors ON or OFF. The phased switch controller 360 can include its own timing control (e.g., a clock, counter, etc.), or the phased switch controller 360 can be in communication with additional components that control timing of the signals output by the phased switch controller 360.

As noted above, when performing self-capacitor 105 sensing of touch events, the signal levels can be very low. For example, the difference in the level of Vin 310 at the end of the second phase 402b between touch and non-touch conditions can be very small. The detection in the third phase 402c depends on discerning between the touch and non-touch levels, which can depend on reliably canceling the base capacitance value of Cs 105. For example, presence of additional noise on either Vin 310 or Vcm 315 can reduce the headroom available for reliable differentiating between touch and non-touch conditions.

Various types of discrete-time operation are widely used for self-capacitor-based touch sensing. Such approaches generally begin by charging Ci (e.g., and a corresponding Vin 310) of each channel to a charged voltage level (e.g., Vcc). In presence of a touch event, part of the charge represents a base self-capacitance value (Cs 105), and part represents additional touch capacitance (Ctouch 205). Techniques seek to cancel the base (Cs 105) portion, so that a residual charge after the canceling represents only the touch (Ctouch 205) portion. Techniques can then convert the residual charge to an output signal, so that the output signal represents only the touch information for the channel. With such approaches, any base portion that still remains after the canceling tends to reduce the sensitivity of the detection. Thus, various conventional approaches have been explored for canceling the base value.

Figure 5:
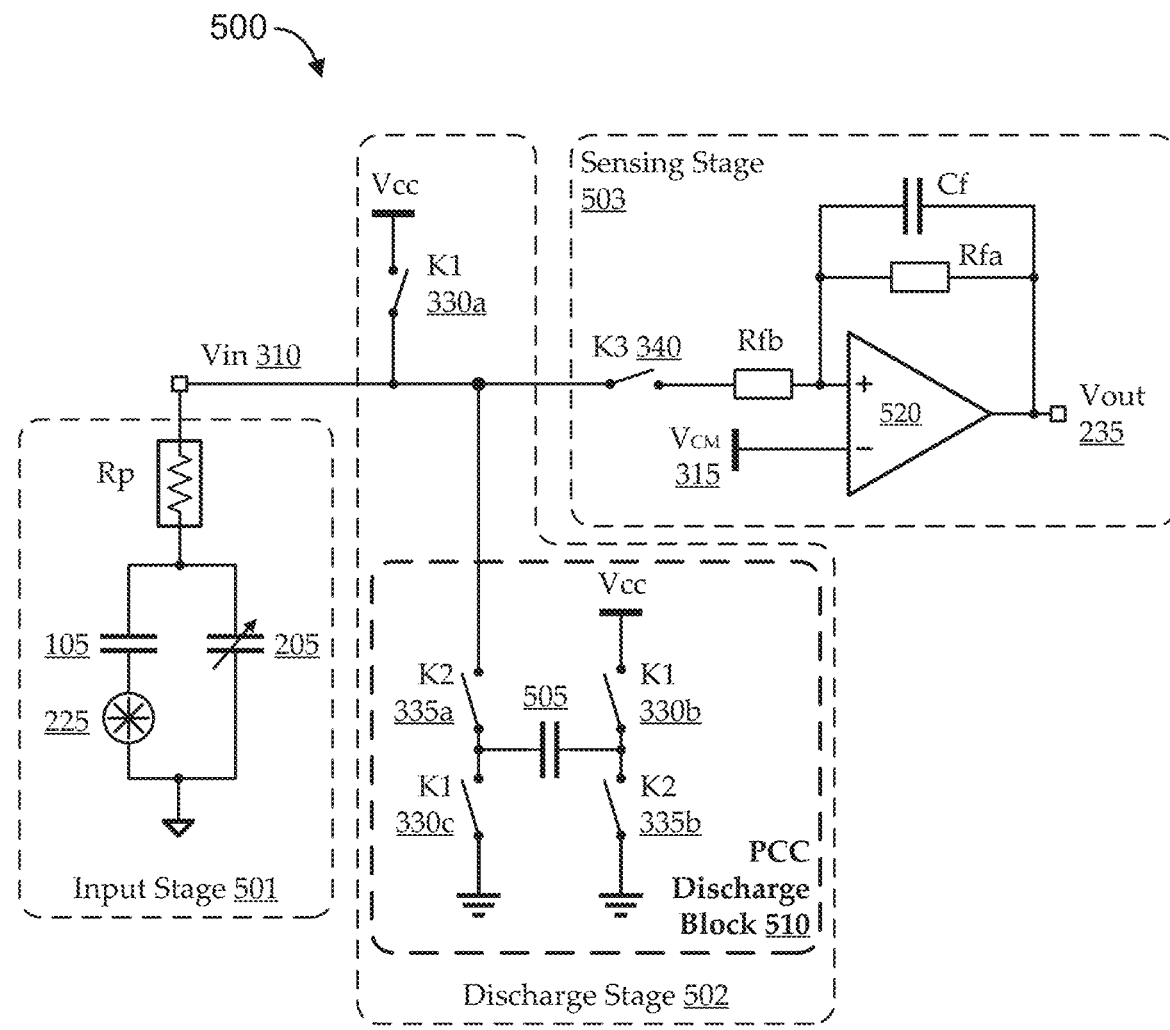
FIG. 5 shows a high-level block diagram of a self-capacitor sensing environment for discrete-time sensing using a conventional pre-charged capacitor (PCC) implementation of a discharge block.
Figure 6:
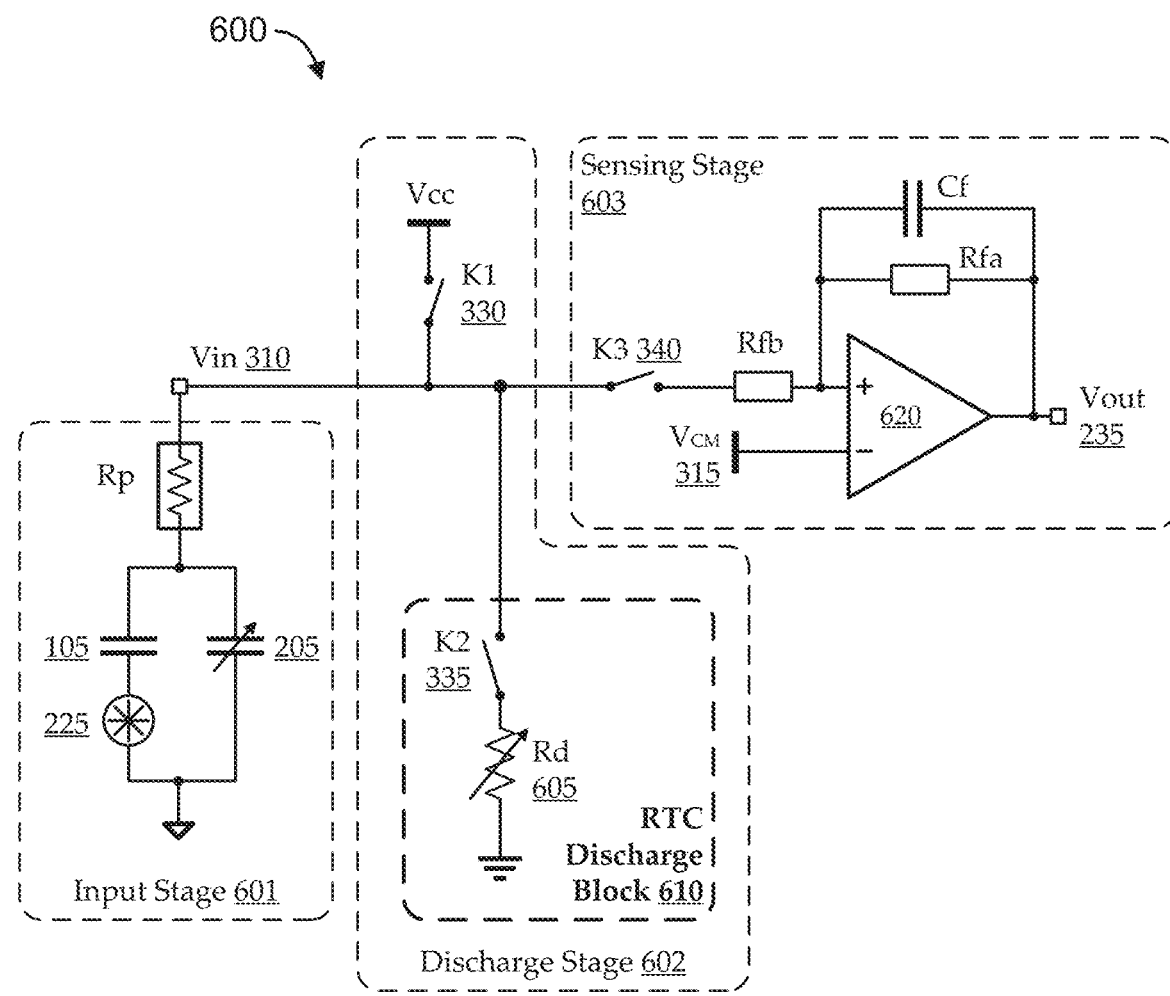
FIG. 6 shows a high-level block diagram of a self-capacitor sensing environment for discrete-time sensing using a conventional resistance-to-time conversion (RTC) implementation of the discharge block.

For added context, FIGS. 5 and 6 illustrated two conventional approaches to canceling base self-capacitance to facilitate touch sensing. FIG. 5 shows a high-level block diagram of a self-capacitor sensing environment 500 for discrete-time sensing using a conventional pre-charged capacitor (PCC) implementation of a discharge block. The environment 500 includes an input stage 501, a discharge stage 502, and a sensing stage 503. The input stage 501 can be substantially the same as the input stage 301 of FIG. 3. For example, inputs stage 501 includes a self-capacitor 105 (manifesting capacitively coupled display noise 225) in parallel with a touch capacitance 205 to form a total channel self-capacitance (Ci). The touch capacitance 205 is represented as a variable capacitor; the touch capacitance 205 is substantially zero when there is no touch event local to the channel, and the touch capacitance 205 is some detectable non-zero amount in presence of a touch event local to the channel. The input stage also include some impedance (Rp).

The discharge stage 502 is implemented as a conventional PCC discharge block 510 having a charging capacitor (Cc) 505. The sensing stage 503 is illustrated generically as including an operational amplifier 520. Similar to FIG. 3, operation of the stages is controlled by various switches, and the timing associated with controlling those switches can be similar to the timing described with reference to FIG. 4. For example, the switches are controlled so that: in a first phase (e.g., corresponding to phase 402a of FIG. 4), switches K1 330 (illustrated as 330a-330c) are set to charge Ci (and Vin 310) to a charged voltage level and to pre-charge Cc 505; in a second phase (e.g., corresponding to phase 402b of FIG. 4), switches K2 335 (illustrated as 335a-335c) are set to use pre-charged Cc 505 to discharge Ci (and Vin 310) to a discharge voltage level; and in a third phase (e.g., corresponding to phase 402b of FIG. 4), switch K3 340 is set to convert the discharge level to an output voltage (Vout 235) representing touch information for the channel.

In particular, in the first phase, switch K1 330a is closed to couple Vin 310 with Vcc, thereby coupling Ci with Vcc through Rp. Concurrently, switches K1 330b and 330c are closed to couple Cc 505 between Vcc 310 and ground. Switches K2 335 are opened, isolating Cc 505 from Vin 310. Thus, while Ci is charging, the PCC discharge block 510 is pre-charging Cc 505. In the second phase, switches K1 330 open and switches K2 335 close. This decouples Cc 505 from its pre-charging path and couples Cc 505 instead with Vin 310. The capacitance of Cc 505 is substantially less than that of Cs 105, so that coupling Cc 505 with Vin 310 causes Cc 505 to pull charge from Ci. As noted above, it can be desirable to configure the discrete-time discharge period (e.g., T 405) and Cc 505 so that the amount of charge pulled away from Cs 105 (Qd) substantially settles Vin 310 as close as possible to Vcm 315. In general, Qd=Id*T, where Id is the discharge current. For this to work properly, the capacitance of Cc 505 is typically selected to be approximately one-third of the capacitance of Cs 105 (e.g., if the capacitance of Cs 105 is 1 nF, Cc 505 can be approximately 330 pF). In the third phase, switch K3 340 is closed to couple discharged Vin 310 with the operational amplifier 620, thereby converting the discharge level (i.e., corresponding to residual charge on Ci) to an output voltage (Vout 235) representing touch information for the channel.

In some applications, use of the PCC discharge block 510 provides various features, such as low sensitivity to clock jitter (particularly in the second phase) due to full settling of operations in each operating phase. However, implementing the PCC discharge block 510 involves providing a Cc 505 for each channel (e.g., each instance of Cs 105 may have a corresponding instance of Cc 505). Particularly where there are tens of channels, or more in a touch panel, the Cc 505 instances can consume a relatively large amount of silicon area, which may be undesirable for many applications.

To avoid the large space penalty associated with the PCC discharge block 510 approach, some conventional implementations use a resistive approach to discharge Ci for each channel over a discrete amount of time. FIG. 6 shows a high-level block diagram of a self-capacitor sensing environment 600 for discrete-time sensing using a conventional resistance-to-time conversion (RTC) implementation of the discharge block. The environment 600 includes an input stage 601, a discharge stage 602, and a sensing stage 603. The input stage 601 can be substantially the same as the input stage 301 of FIG. 3 and the input stage 501 of FIG. 5. For example, inputs stage 601 includes a self-capacitor 105 (manifesting capacitively coupled display noise 225) in parallel with a touch capacitance 205 to form a total channel self-capacitance (Ci). The touch capacitance 205 is represented as a variable capacitor; the touch capacitance 205 is substantially zero when there is no touch event local to the channel, and the touch capacitance 205 is some detectable non-zero amount in presence of a touch event local to the channel. The input stage also include some impedance (Rp).

The discharge stage 602 is implemented as a conventional RTC discharge block 610 having a discharging resistor (Rd) 605 (illustrated as a variable resistor). The sensing stage 603 is illustrated generically as including an operational amplifier 620. Similar to FIGS. 3 and 5, operation of the stages is controlled by various switches, and the timing associated with controlling those switches can be similar to the timing described with reference to FIG. 4. For example, in a first phase (e.g., corresponding to phase 402a of FIG. 4), switch K1 330 is closed to charge Ci (and Vin 310) to a charged voltage level. In a second phase (e.g., corresponding to phase 402b of FIG. 4), switch K1 330 is opened, and switch K2 335 is closed to discharge Ci (and Vin 310) to a discharge voltage level through Rd 605. In a third phase (e.g., corresponding to phase 402b of FIG. 4), switch K3 340 is closed to couple Vin 310 with the operational amplifier 620, thereby converting the discharge level (i.e., corresponding to residual charge on Ci) to an output voltage (Vout 235) representing touch information for the channel.

As noted above, the RTC discharge block 610 implementation does not rely on multiple instances of large capacitors (instances of Cc 505) and can be appreciably more space efficient, accordingly. However, because current and voltage are inversely proportional in a resistor, the amount of charge being discharged through Rd 605 varies over the second phase along with the change in Vin 310. As such, the discharging provided by the RTC discharge block 610 can produce a very large (e.g., approximately 40-percent) signal loss. Further, the RTC discharge block 610 can be highly sensitive to clock jitter during discharging. For example, while the discharge period (e.g., T 405) is intended to be a predetermined, discrete amount of time, clock noise can result in slight changes in the width of the pulse used to control the on and off timing of K2 335, which can effectively change the discharge period. It is known that capacitor current (Ic) is related to its capacitance and a change in voltage over time: $Ic=C*(dV/dt)$. If there is added pulse-width time due to clock jitter (Tj), for a discharge current (Id), the voltage error induced at Vin 310 from the jitter (Vin_e) can be described as: $Vin\_e = Tj \cdot Id/(Cs+Ctouch)$.

Figure 7:
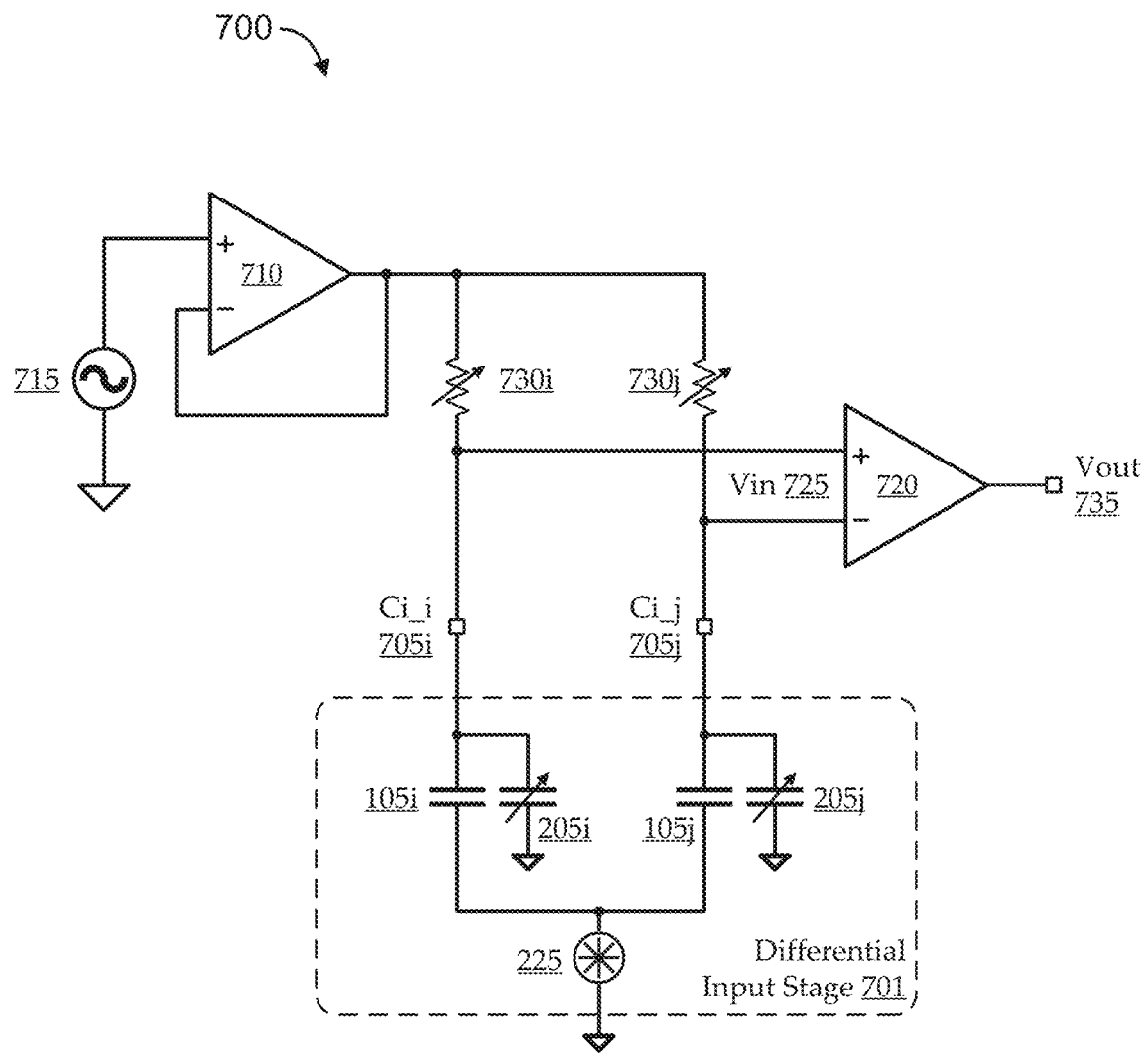
FIG. 7 shows a simplified circuit diagram of an illustrative self-capacitance-based touch sensing system that uses a voltage-mode bridge.

To avoid some of the limitations of PCC- and RTC-based approaches to self-capacitance-based sensing, a voltage-mode bridge has been proposed. FIG. 7 shows a simplified circuit diagram 700 of an illustrative self-capacitance-based touch sensing system that uses a voltage-mode bridge. As illustrated, the voltage-mode bridge approach relies on a differential input stage 701. The differential input stage 701 represents two touch sense channels of a touch panel array, an ith channel and a jth channel. Each channel has a respective total channel capacitance, Ci 705, labeled as Ci_i 705*i* and Ci_j 705*j*, respectively. As described herein, each Ci 705 can include a respective base self-capacitance (Cs 105, labeled as 105*i* and 105*j* for the ith and jth channels, respectively), manifesting capacitively coupled display noise 225 from an integrated display panel. Each Ci 705 can also include a respective touch capacitance (Ctouch 205, labeled as 205*i* and 205*j* for the ith and jth channels, respectively), which varies responsive to presence or absence of a touch event local to the associated channel.

It is generally assumed that, while the display noise 225 can vary across the display panel, it tends to have very little local variance. The illustrated context of FIG. 7 assumes that the ith and jth channels are generally any adjacent channels. The term "adjacent" is used herein to generally refer to any channels or related components (e.g., and any associated metal row or column lines, mutual capacitors, etc.) which are directly adjacent to each other on the touch panel, within several rows of each other on the touch panel, or otherwise sufficiently proximate to each other so that the display noise coupled to those channels can be treated as common-mode noise for cancelation purposes described herein. In some embodiments, the ith and jth channels are directly adjacent channels of a touch panel array (e.g., directly adjacent row lines or directly adjacent column lines). In other embodiments, the ith and jth channels are not directly adjacent, but are proximate enough to experience sufficiently common-mode display noise for purposes of cancelation by sense circuitry described herein.

Because the ith and jth channels are assumed to be adjacent, the display noise 225 is assumed to be common mode noise for the pair of channels. As such, the Cs 105 for both channels of the differential input stage 701 are shown coupled with a same representation of display noise 225. On the same basis, Cs 105*i* and Cs 105*j* can be assumed to have substantially the same (e.g., or very close) base self-capacitance, so that any difference between Ci_i 705*i* and Ci_j 705*j* is primarily due to differences between Ctouch 205*i* and Ctouch 205*j*, representing touch information.

The differential input stage 701 is coupled with a voltage-mode bridge that includes an alternating current (AC) voltage source 715, a driver amplifier 710, an output amplifier 720, and two variable resistors 730 (labeled as resistors 730*i* and 730*j* for the ith and jth channels, respectively). The AC voltage source 715 outputs a sinusoidal driver signal, which is buffered (e.g., and amplified) by the driver amplifier 710. Each variable resistor 730 is associated with a respective branch of the voltage-mode bridge. In one branch, variable resistor 730*i* is coupled at one side with the output of the driver amplifier 710 (i.e., a buffered version of the sinusoidal driver signal), and is coupled at its other side with Ci_i 705*i* and with one of two differential inputs (e.g., the positive input) of the output amplifier 720. In the other branch, variable resistor 730*j* is coupled at one side with the output of the driver amplifier 710, and is coupled at its other side with Ci_j 705*j* and with the other of the two differential inputs (e.g., the negative input) of the output amplifier 720. Thus, the differential inputs to the output amplifier 720 represent a differential input voltage, Vin 725. To maximize output signals in each branch, the resistance of each variable resistor 730 is adjusted to match the impedance of its respective Ci 705 (i.e., variable resistor 730*i* is matched to the impedance of Ci_i 705*i*, and variable resistor 730*i* is matched to the impedance of Ci_j 705*j*).

During operation, the sinusoidal driver signal from the driver amplifier 710 is used to sinusoidally drive each branch of the voltage-mode bridge, thereby producing a corresponding channel response signal in each branch that corresponds to the Ci 705 associated with the branch. Each channel response signal will include a base component due to the Cs 105 of the branch and a touch component due to the Ctouch 205 of the branch (e.g., the touch component can be absent if there is no local touch event). If as assumed above, Cs 105*i* and Cs 105*j* are substantially the same, the respective base components of channel response signals will be substantially the same. At the inputs to the output amplifier, the substantially matching base components will manifest as a common mode portion of Vin 725 and will tend to be ignored (e.g., rejected) by the output amplifier 720. As such, the output generated by the amplifier, Vout 735, will represent the difference between the channel response signals. This difference will primarily be due to touch components of the signals, thereby representing local touch information.

While such an approach can effectively cancel some capacitively coupled display noise, it has certain limitations. One limitation is that, matching each variable resistor 730 to the impedance of its associated Ci 705 essentially forms a voltage divider at each input to the output amplifier. Thus, approximately half of each channel response signal is lost on the corresponding variable resistor 730, and the voltage swing on Ci 705 is only half of what is applied by the sinusoidal driver signal. Another limitation is that around half of the display noise will be transferred to the output amplifier (e.g., to tapping points coupling the differential input stage 701 with the voltage-mode bridge). Even though the display noise appears to the bridge as a common-mode signal and is ultimately rejected by the output amplifier 720, it still consumes input dynamic range of the output amplifier 720. This can reduce the available dynamic range for detecting the differential signal, thereby reducing the sensitivity of the output amplifier 720 to touch information.

The various approaches described above, including the conventional PCC and RTC approaches, and the voltage-mode bridge approach, can be successful in some applications. However, they tend to be highly vulnerable to display noise, which can be much larger than the induced signal changes in a channel due to local touch events. As such, implementing these and other approaches in high-performance applications typically relies on synchronizing touch event sensing to timing of display control signals to reduce the impact of capacitively coupled display noise (i.e., to try to preform sensing operations only while the display noise is relatively low, and to avoid performing sensing operations while the display noise is relatively high). Designing implementations to handle such synchronization can increase system complexity and can reduce system flexibility. Further, as capacitively coupled display noise continues to increase, it can be difficult to find time windows with sufficiently low display noise to support reliable touch sensing with such conventional approaches.

Embodiments described herein include various novel techniques for self-capacitor-based sensing using a current-mode alternating current (AC) bridge for increased sensitivity and a resulting increase in touch-sensing performance. Such embodiments can operate without synchronizing to display control signals. One resulting feature is that embodiments described herein can support self-capacitor sensing in non-synchronized modes of operation. Another resulting feature is that embodiments described herein can support stimulus frequency hopping. Another resulting feature is that embodiments described herein can support higher display noise scenarios, such as where an insufficient amount of display noise is cancelable merely synchronizing sensing to display signals.

Figure 8:
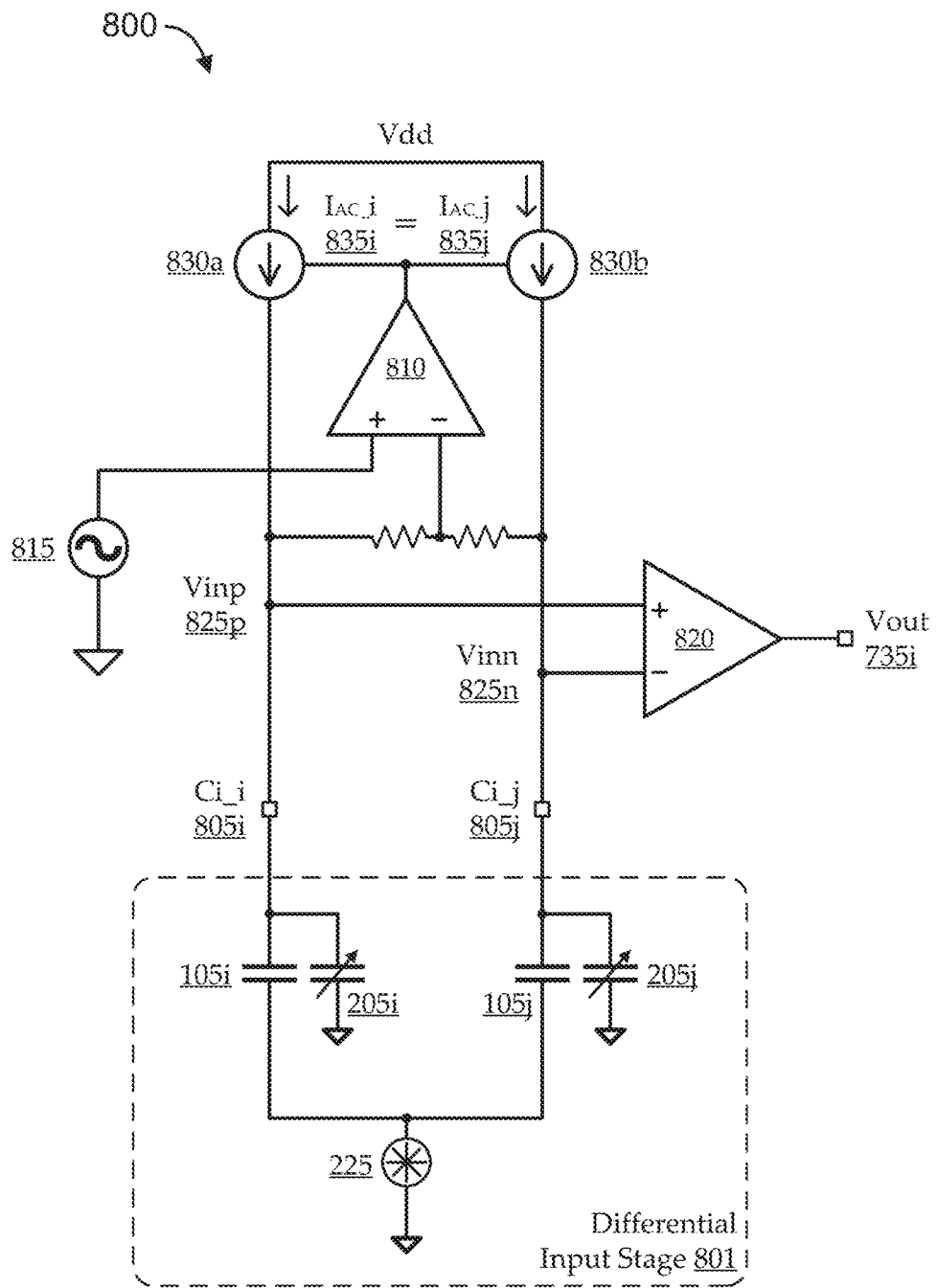
FIG. 8 shows a simplified circuit diagram of an illustrative self-capacitance-based touch sensing system that uses an alternating-current-mode (AC-mode) bridge approach.

FIG. 8 shows a simplified circuit diagram 800 of an illustrative self-capacitance-based touch sensing system that uses an alternating-current-mode (AC-mode) bridge approach. Similar to FIG. 7, the AC-mode bridge approach relies on a differential input stage 801 representing two touch sense channels of a touch panel array (an ith channel and a jth channel). Each channel has a respective total channel capacitance, Ci 805, labeled as Ci_i 805i and Ci_j 805j, respectively. As described herein, each Ci 805 can include a respective base self-capacitance (Cs 105, labeled as 105i and 105j for the ith and jth channels, respectively), manifesting capacitively coupled display noise 225 from an integrated display panel. Each Ci 805 can also include a respective touch capacitance (Ctouch 205, labeled as 205i and 205j for the ith and jth channels, respectively), which varies responsive to presence or absence of a touch event local to the associated channel.

The AC-mode bridge includes a sinusoidal voltage source 815, an error amplifier 810, an output amplifier 820, and two adjustable current sources 830. The AC-mode bridge has two branches, each coupled with a respective channel of the differential input stage 801 (i.e., each branch of the AC-mode bridge is effectively coupled with a respective Ci 805). In the first branch, a first adjustable current source 830a is coupled between a local source voltage (Vdd) and a positive branch voltage (Vinp) node 825p, which is coupled with the ith Ci 805i. In the second branch, a second adjustable current source 830b is coupled between a local source voltage (Vdd) and a negative branch voltage (Vinn) node 825n, which is coupled with the jth Ci 805j. The Vinp node 825p and the Vinn node 825n are also coupled with respective differential inputs to the output amplifier 820, such that a voltage difference between the Vinp node 825p and the Vinn node 825n is a differential input voltage of the output amplifier 820.

Embodiments are designed so that the two adjustable current sources 830 are nominally identical. The phrase "nominally identical" (and variants thereof) refers to a design intention of equivalence, interchangeability, etc., recognizing that it is impractical or impossible for components to be identical in real-world implementations of a circuit, or other manufactured product. For example, two current sources are considered herein to be "nominally identical" if they are designed or intended as copies of each other (i.e., as two instances of the same component), regardless of whether process variations and other real-world considerations will tend practically to prevent the current sources from being truly identical. Some of the circuits described herein seek at least partially to compensate for real-world implementation differences arising between nominally identical components.

The error amplifier 810 is configured as a feedback loop to control the two adjustable current sources 830, so that each generates a same sinusoidal current 835 (labeled as $I_{AC}\_i$ 835i and $I_{AC}\_j$ 835j for the ith and jth channels, respectively) following a sinusoidal driver signal that is output by the AC voltage source 815. As illustrated, a first (e.g., positive) input to the error amplifier 810 is coupled with the sinusoidal voltage source 815 to receive the sinusoidal driver signal. A second (e.g., negative) input to the error amplifier 810 is coupled with both branches (e.g., via respective resistors to convert the sinusoidal currents 835 to a voltage at the second input to the error amplifier 810). The output of the error amplifier 810 is used as the voltage control for both adjustable current sources 830.

With the error amplifier 810 in this feedback configuration, the sinusoidal currents 835 are forced to be equal. As such, any differential voltage between the Vinp node 825p and the Vinn node 825n is due to a difference between Ci 805i and Cj 805j. Thus, the output of the output amplifier, Vout 730i, will represent a difference in touch information between the ith and jth channels. For example, if Ctouch 205 is substantially zero in both branches (i.e., there is no touch condition local to either the ith or jth channel) and Cs 105 is substantially equal in both branches (i.e., substantially all of the display noise 225 is common to both branches), there will be substantially no differential voltage at the input to the output amplifier 820, and Vout 735i will be substantially zero. If Ctouch 205 in either channel is non-zero (i.e., there is a touch condition local to either the ith or jth channel) and Cs 105 remains substantially equal in both branches, there will be a differential voltage at the input to the output amplifier 820, which will generate a corresponding Vout 735i signal.

As noted above, the correlated display noise 225 at the Vinp node 825p and the Vinn node 825n manifest as common mode signal components. From the perspective of these common mode signals, because of the feedback loop to the error amplifier 810, the Vinp node 825p and the Vinn node 825n are both low-impedance nodes. Thus, the display noise 225 will be greatly mitigated at the inputs to the output amplifier 820. As such (e.g., in contrast to the voltage-mode bridge of FIG. 7), the display noise 225 will not tend to degrade the dynamic range of the output amplifier 820 and will not contribute a large amount of noise. Because of this appreciable reduction in the effect of display noise 225 on the sensitivity of the output amplifier 820, the AC-mode bridge approach can be implemented without relying on synchronization with display control signals. For example, the AC-mode bridge can be implemented without relying on additional complex signals and circuits that are dedicated to restricting operation of the sensing circuits only during time windows of low display noise. Further, because operation of the AC-mode bridge does not rely on such synchrony with the display signals, the frequency of the sinusoidal driver signal can be set independent of any particular display noise 225 profile.

Further explanations of and descriptions of several variants of the AC-mode bridge of FIG. 8 can be found in U.S. patent application Ser. No. 18/187,648, filed on Mar. 21, 2023, and titled "SELF-CAPACITOR SENSING USING ALTERNATING-CURRENT-MODE BRIDGE FOR CAPACITIVE TOUCH PANELS," which is incorporated herein in its entirety.

Figure 9:
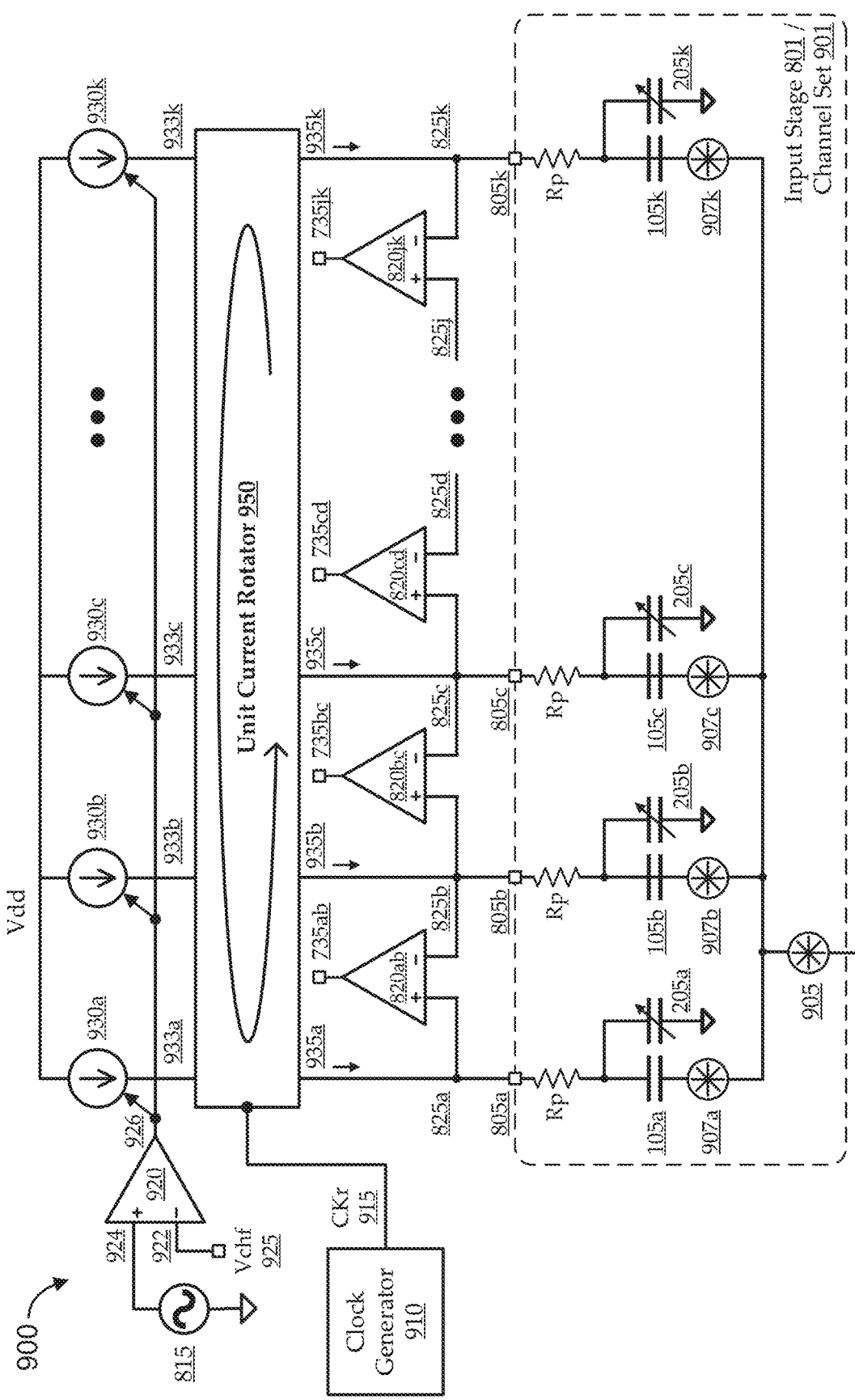
FIG. 9 shows a simplified circuit diagram of a novel type of self-capacitance-based touch sensing system that uses a multi-branch AC-mode bridge approach with global current rotation, according to embodiments described herein.

FIG. 9 shows a simplified circuit diagram 900 of a novel type of self-capacitance-based touch sensing system that uses a multi-branch alternating-current-mode (AC-mode) bridge approach with global current rotation, according to embodiments described herein. Similar to FIG. 8, the multi-branch AC-mode bridge relies on a differential input stage 801. However, the differential input stage 801 of FIG. 9 provides multiple differential pairs of channels of a touch panel array, illustrated as a channel set 901. As illustrated, the channel set 901 can include K channels of the touch panel array, represented as channels 'a' through 'k', where K is at least 3 (i.e., the term "multi-branch AC-mode bridge" assumes at least three branches). In some embodiments, the K channels include all touch sensing channels of the touch panel array. In some embodiments, the K channels include all touch sensing channels running in a common direction (e.g., channels associated with 105ra-105rn of FIG. 1). In some embodiments, the K channels include a group of channels determined to have approximately the same display noise 905 (e.g., all touch sense channels some distance away from the periphery of the touch panel array).

The differential input stage 801 can provide differential pairs of the K channels in any suitable manner so that each channel is part of at least one of the differential pairs. In the illustrated implementation, the K channels generate K–1 differential pairs as follows: channels 'a' and 'b', channels 'b' and 'c', channels 'c' and 'd', . . . , channels 'j' and 'k'. Alternatively, an additional differential pair can be provided, such as channels 'k' and 'a'. The differential pairs can be provided as between directly adjacent channels, or between any channels having sufficiently similar display noise 905 as to be within the common-mode rejection capability of the AC-mode bridge.

As in other differential input stage 801 embodiments described above, each channel has a respective total channel capacitance, Ci 805, labeled as 805a-805k. As described herein, each Ci 805 can include a respective base self-capacitance (Cs 105, labeled as 105a-105k), manifesting capacitively coupled display noise from an integrated display panel. In each channel, the capacitively coupled display noise can be considered as primarily a shared noise component 905 with the addition (or subtraction) of a small, or even negligible, channel delta noise component 907, represented as 907a-907k. For example, in each channel, a sum of noise components 905 and 907 are substantially equivalent to what is referred to elsewhere herein as display noise 225. Each Ci 805 can also include a respective touch capacitance (Ctouch 205, labeled as 205a-205k), which varies responsive to presence or absence of a touch event local to the associated channel. Each channel can also be considered as having an impedance, represented as 'Rp'.

The multi-branch AC-mode bridge includes K branches, and each of the K channels of the channel set 901, as provided by the differential input stage 801, is coupled with a respective one of the K branches of the multi-branch AC-mode bridge. Similar to FIG. 8, the multi-branch AC-mode bridge produces a respective sinusoidal branch current 935 (labeled as 935a-935k) on each branch. Each respective sinusoidal branch current 935 produces a corresponding respective branch voltage 825 (labeled as 825a-825k) based on the Ci 805 and impedance (Rp) of the branch. For each differential pair of channels, the respective branch voltages 825 of the corresponding pair of branches are coupled into differential inputs of a respective output amplifier 820 (labeled 820ab-820jk). As such, a voltage difference between each pair of branch voltages 825 is a differential input voltage of each corresponding output amplifier 820, from which each corresponding output amplifier 820 generates a respective output voltage, Vout 735, for the differential pair of channels. For example, channels 'a' and 'b' are coupled with branches having sinusoidal branch currents 935a and 935b, respectively; such that the branches also manifest branch voltages 825a and 825b, respectively. Those branch voltages 825a and 825b are coupled into respective inputs of output amplifier 820ab, which produces Vout 735ab, accordingly. As described further herein, Vout 735ab effectively represents a difference in touch information between channels 'a' and 'b'.

As illustrated, the multi-branch AC-mode bridge further includes a sinusoidal voltage source 815, an error amplifier 920, K adjustable current sources 930, and a unit current rotator 950. Embodiments are designed so that the K adjustable current sources 830 are nominally identical. The phrase "nominally identical" (and variants thereof) refers to a design intention of equivalence, interchangeability, etc., recognizing that it is impractical or impossible for components to be identical in real-world implementations of a circuit, or other manufactured product. For example, current sources are considered herein to be "nominally identical" if they are designed or intended as copies of each other (i.e., as instances of the same component), regardless of whether process variations and other real-world considerations will tend practically to prevent the current sources from being truly identical. Some of the circuits described herein seek at least partially to compensate for real-world implementation differences arising between nominally identical components.

The error amplifier 920 is configured as a feedback loop to control the K adjustable current sources 930, so that each generates substantially the same sinusoidal input current 933 (labeled as 933a-933k). As illustrated, a first (e.g., positive) input 924 to the error amplifier 920 is coupled with the sinusoidal voltage source 815 to receive a sinusoidal driver signal. A second (e.g., negative) input 922 to the error amplifier 920 is coupled with a feedback channel voltage, Vchf 925. In some embodiments, Vchf 925 is a selected one of the branch voltages 825 associated with one of the K channels of the channel set 901. In other embodiments, Vchf 925 is derived from two or more of the K branch voltages 825. For example, Vchf 925 can be generated as an analog average of two or more, or even all, of the K branch voltages 825. In some embodiments, Vchf 925 is dynamically selectable and/or programmable. In some such embodiments, Vchf 925 can be generated using a different one, or different ones, of the K branch voltages 825 according to a sequence. For example, as described below, a clock generator 910 is used to control rotation timing of the unit current rotator 950, and the same clock generator 910 can be used to control timing of which branch voltage(s) 825 to select for providing Vchf 925.

The output of the error amplifier 810 is an error signal 926 that indicates an error between the sinusoidal driver signal provided by the sinusoidal voltage source 815 and the sinusoidal branch voltage(s) 825 fed back to the error amplifier 920. The error signal 926 is used as a control signal for the K adjustable current sources 930. In effect, the K sinusoidal input currents 933 generated by the K adjustable current sources 830 are all controlled by the same feedback loop through error amplifier 920 and are all nominally identical.

Each of the K sinusoidal input currents 933 is received at a respective one of K rotator inputs to the unit current rotator 950, and each of the K branches is coupled with a respective one of K rotator outputs of the unit current rotator 950. The multi-branch AC-mode bridge uses the unit current rotator 950 to generate the K sinusoidal branch currents 935 for the K branches based on a sequential rotation through the sinusoidal input currents 933. The unit current rotator 950 iterates over a rotation cycle, each cycle having K frames. Timing of the unit current rotator 950, including the duration of a rotation cycle, durations of frames, etc. is controlled by a rotator clock signal (Ckr) 915 generated by the clock generator 910. The unit current rotator 950 generates each sinusoidal branch current 935 with a different respective one of the sinusoidal input currents 933 in each frame, such that each sinusoidal input current 933 is used to generate any particular sinusoidal branch current 935 for only 1/K of each rotation cycle. For example, the unit current rotator 950 can generate sinusoidal branch current 935a, over each rotation cycle, by: in a first frame, coupling the first rotator input with the first rotator output (i.e., thereby coupling the first sinusoidal input current 933a with the first branch); in a second frame, coupling the second rotator input with the first rotator output (i.e., thereby coupling the second sinusoidal input current 933a with the first branch); . . . ; and in a Kth frame, coupling the Kth rotator input with the first rotator output (i.e., thereby coupling the Kth sinusoidal input current 933k with the first branch).

Because of the current rotation, any mismatch between adjustable current sources 930, any noise from adjustable current sources 930, etc. is equalized over all K branches to produce effectively identical sinusoidal branch currents 935. As such, all K channels are effectively driven by a same current stimulus. In each differential pair of branches, any difference between branch voltages 825 is due to a difference between respective total channel impedances 805. Differential readout of the branch voltages 825 in each differential pair of channels through each respective output amplifier 820 mitigates any common noise (i.e., the shared component of the display noise 905. Assuming remaining noise components (e.g., display noise components 907) are negligible or below a threshold noise floor, each Vout 735 will represent a difference in touch information between the differential pair of channels.

Figure 10:
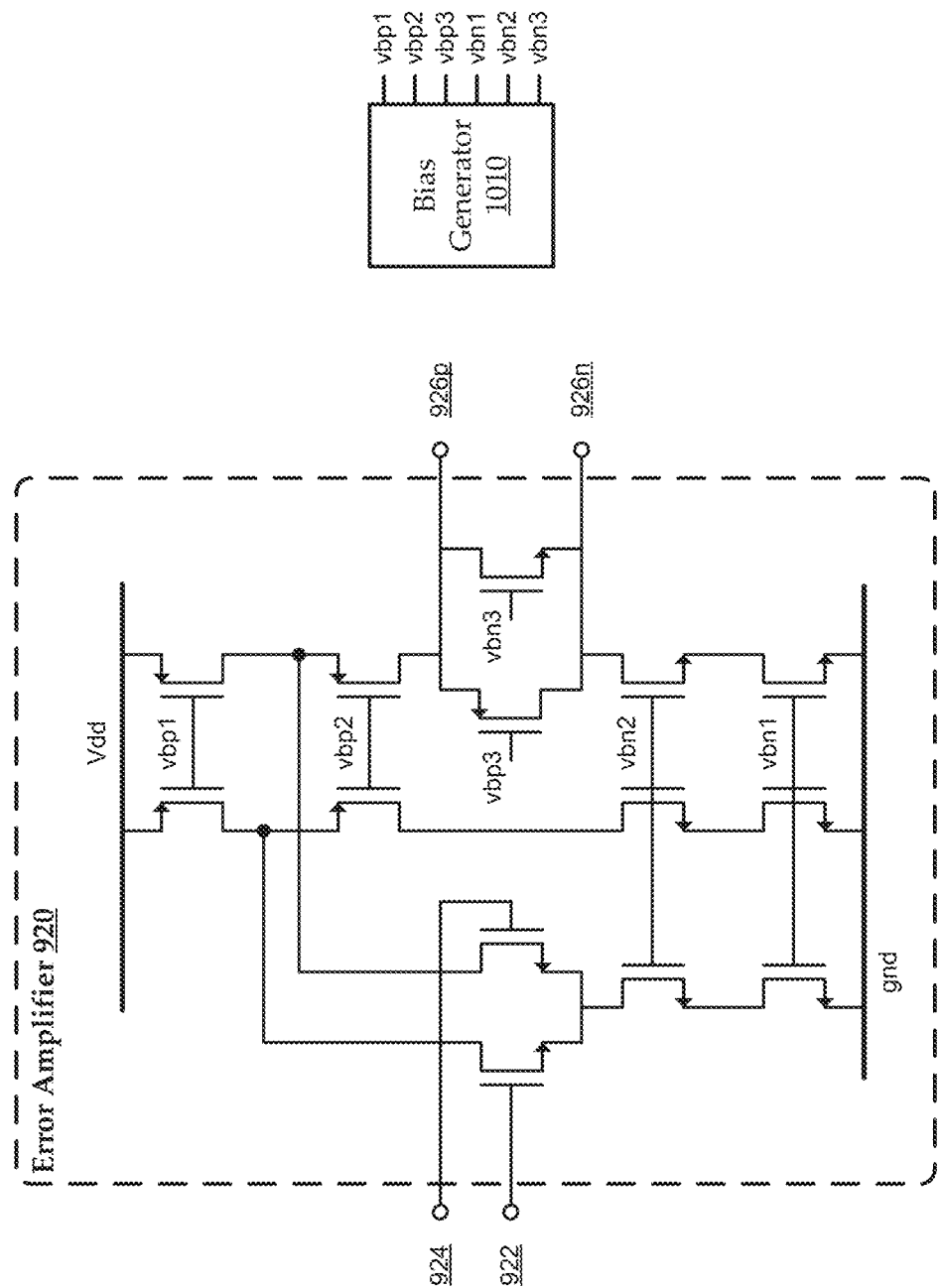
FIG. 10 shows a circuit diagram of an illustrative error amplifier for use with embodiments described herein.
Figure 11:
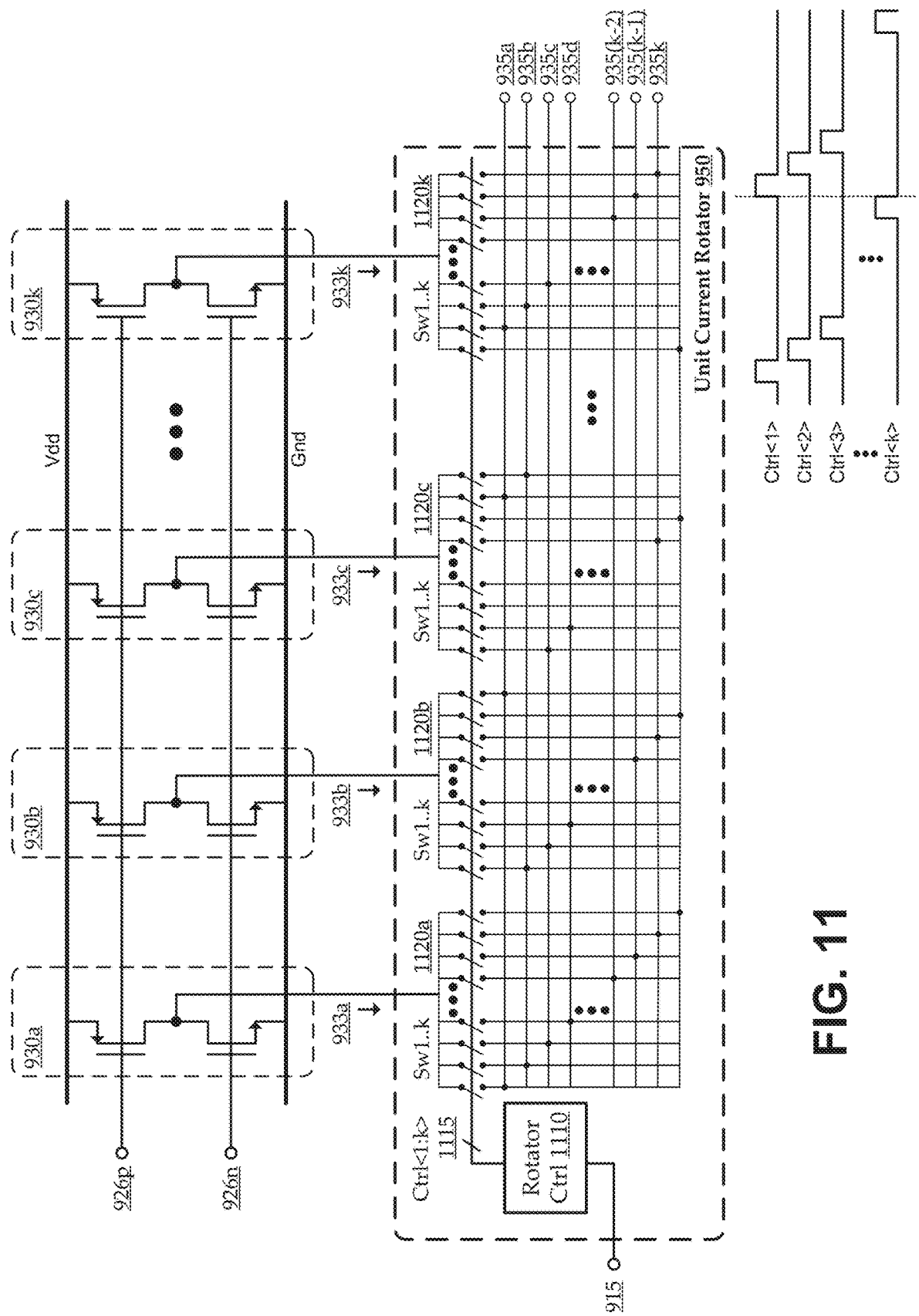
FIG. 11 shows a circuit diagram of an illustrative implementation of a set of adjustable current sources coupled with a unit current rotator, according to various embodiments described herein.
Figure 12:
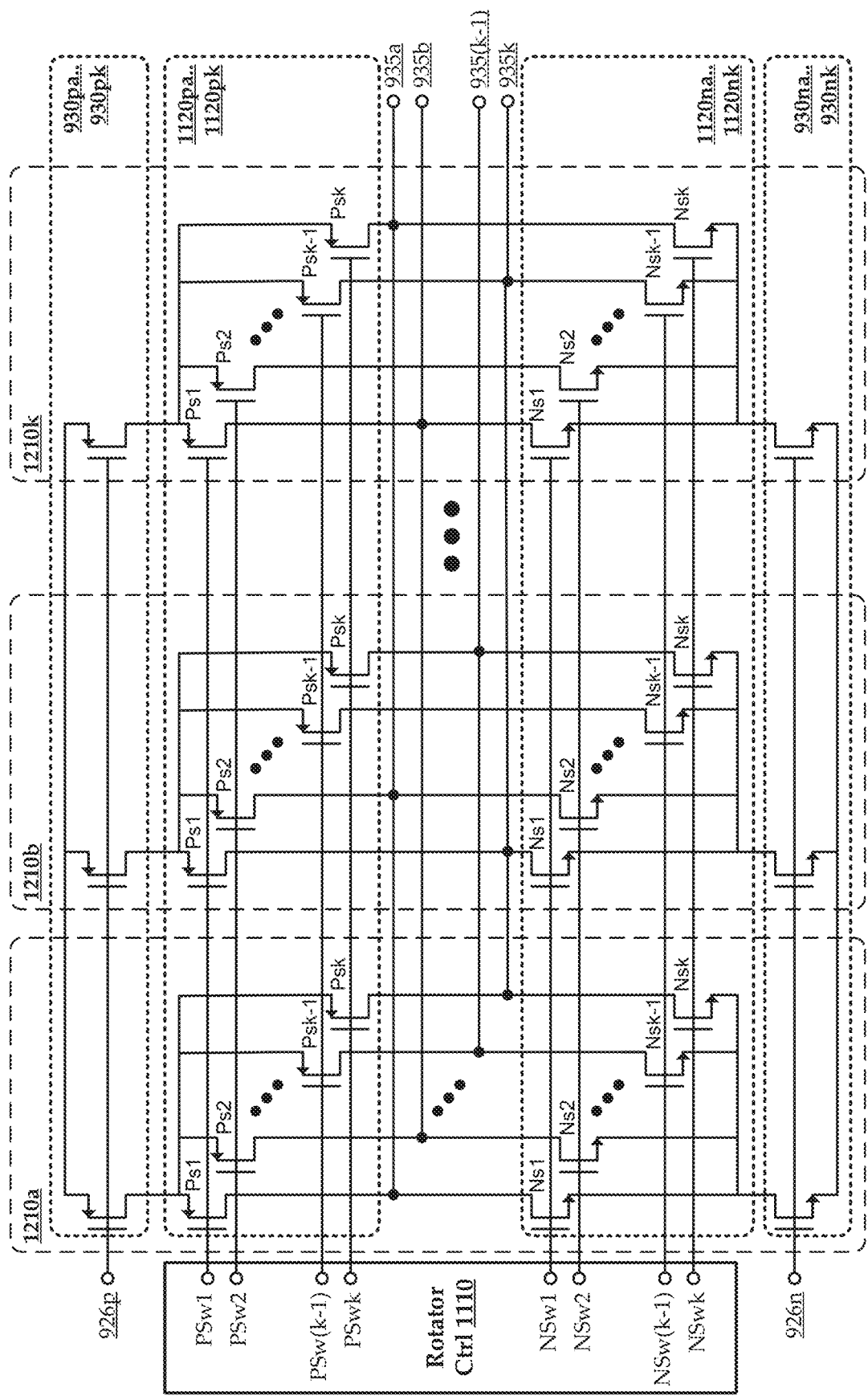
FIG. 12 shows an alternative circuit diagram for an illustrative implementation of a set of adjustable current sources coupled with a unit current rotator, such as those shown in FIG. 11.

FIGS. 10-12 show illustrative circuit implementations to support implementation of a multi-branch AC-mode bridge with a unit current rotator 950, as in FIG. 9. FIG. 10 shows a circuit diagram of an illustrative error amplifier 920 for use with embodiments described herein. The error amplifier 920 can be an illustrative implementation of the error amplifier 920 of FIG. 9. As illustrated, the error amplifier 910 takes the inputs 922 and 924, which can represent positive and negative inputs of the error amplifier. As described above, the inputs 922 and 924 can be coupled with a channel feedback voltage (e.g., Vchf 925 of FIG. 9) and with a sinusoidal driver signal (e.g., generated by the sinusoidal voltage source 815 of FIG. 9), respectively. The error amplifier 920 is implemented as complementary metal-oxide semiconductor (CMOS) operational amplifier, controlled by a six bias signals: vbp1, vbp2, vbp3, vbn1, vbn2, and vbn3. The bias signals can be generated by a bias generator 1010, so that the error amplifier 920 outputs a sinusoid waveform, error signal 926, corresponding to a difference between inputs 922 and 924. In the illustrated embodiment, the error signal 926 is output as two complementary signals: 926p and 926n.

FIG. 11 shows a circuit diagram of an illustrative implementation of a set of adjustable current sources 930 coupled with a unit current rotator 950, according to various embodiments described herein. The K adjustable current sources 930 illustrated in FIG. 11 can be an implementation of the K adjustable current sources 930 of FIG. 9. In the illustrated implementation, the adjustable current sources 930 are identically implemented. Each of the adjustable current sources 930 is implemented as a PMOS transistor in series with an NMOS transistor, both coupled between a source voltage level (Vdd) and a ground level (GND). To save the static power, the adjustable current sources 930 are implemented as "class-AB" current sources. The class-AB current sources are designed to share the same control and have the same size transistors, such that each would produce the same output current. The output of each adjustable current source 930 is a respective one of K sinusoidal input currents 933, represented as 933a-933k.

The sinusoidal input currents 933 output by the adjustable current sources 930 are controlled by a complementary set of error signals 926p and 926n. For example, the adjustable current sources 930 are controlled by the output of the error amplifier 920 of FIG. 9 or 10. One of the complementary error signals 926p is coupled with the PMOS half of each adjustable current source 930, and the other of the complementary error signals 926n is coupled with the NMOS half of each adjustable current source 930. Because of the complementary nature of the error signals 926p and 926n, they will jointly control each series pair of PMOS and NMOS transistors, thereby controlling the current output by the adjustable current sources 930.

As illustrated, the unit current rotator 950 can be implemented as a set of switching networks 1120 controlled by a rotator controller 1110. The rotator controller 1110 can output a switching control signal 1115 to control switches of the switching networks 1120. Embodiments of the rotator controller 1110 are controlled by a rotator clock signal (Ckr) 915, such as generated by the clock generator 910 of FIG. 9. Each switching network 1120 includes a respective instance of K switches (labeled as Sw1 . . . k) configured to couple a respective one of the adjustable current sources 930 (i.e., a respective one of the sinusoidal input currents 933) to a selected one of K output paths responsive to the switching control signal 1115. As illustrated in FIG. 9, each of the K output paths is coupled with a respective one of the K branches, such that the current passed to each output path becomes the corresponding one of the K sinusoidal branch currents 935 (i.e., 935a-935k). For example, closing a first switch of the first switching network 1120a couples the first sinusoidal input current 933 to the first output path, so that the first sinusoidal branch current 935 corresponds to the first sinusoidal input current 933; closing a first switch of the second switching network 1120b couples the second sinusoidal input current 933 to the second output path, so that the second sinusoidal branch current 935 corresponds to the second sinusoidal input current 933; closing a second switch of the first switching network 1120a couples the first sinusoidal input current 933 to the second output path, so that the first sinusoidal branch current 935 corresponds to the second sinusoidal input current 933; etc.

In some implementations, in each rotation cycle, Ckr 915 triggers K frames; and in each kth frame (where k increases from 1 to K in each frame), the switching control signal 1115 closes the kth switch in each of the switching networks 1120. An illustrative representation of such signaling is shown in FIG. 11. For example, in each first frame, the first switch of all switching networks 1120 is closed; in each second frame, the second switch of all switching networks 1120 is closed; . . . ; and in each Kth frame, the Kth switch of all switching networks 1120 is closed. It can be seen that this effectively causes each sinusoidal branch current 935 to rotate through all K sinusoidal input currents 933 over each rotation cycle.

FIG. 12 shows an alternative circuit diagram for an illustrative implementation of a set of adjustable current sources 930 coupled with a unit current rotator 950, such as those shown in FIG. 11. The circuit architecture of FIG. 12 can be considered as K nominally identical circuit block instances 1210, each including a respective one of K instances of adjustable current sources 930 and a respective one of K instances of switching networks 1120. As described with reference to FIG. 11, each of the adjustable current sources 930 is implemented as a PMOS transistor (labeled as K instances of a PMOS portion of the adjustable current source 930pa . . . 930pk) in series with an NMOS transistor (labeled as K instances of a NMOS portion of the adjustable current source 930na . . . 930nk). To save the static power, the adjustable current sources 930 can be implemented as "class-AB" current sources. Also as described with reference to FIG. 11, the K instances of the PMOS portion of the adjustable current source 930pa . . . 930pk are controlled by a first complementary error signal 926p, and the K instances of the NMOS portion of the adjustable current source 930na . . . 930nk are controlled by a second complementary error signal 926n.

Similarly, each of the K switching networks 1120 can include a respective K complementary pairs of PMOS and NMOS switching transistors (i.e., the K switching networks 1120 can be implemented by K*K complementary pairs of switching transistors). The K PMOS switching transistors in each switching network 1120 are labeled Ps1-Psk, and the K NMOS switching transistors in each switching network 1120 are labeled Ns1-Nsk. Each complementary pair of switching transistors is switched on or off by a respective complementary pair of switching signals, such as the switching control signal 1115 illustrated in FIG. 11. As illustrated, the switching signals for the PMOS switching transistors are labeled as PSw1-PSwk, and the switching signals for the NMOS switching transistors are labeled as NSw1-NSwk. In each switching network 1120, each complementary pair of switching transistors (i.e., each switch) is coupled with one of K respective output paths to deliver a respective one of K sinusoidal branch currents 935 (labeled 935a-935k) to a corresponding one of K branches of a multi-branch AC-mode bridge architecture.

As described above, a rotator controller 1110 can rotate through the switching control signal sequentially, or in any suitable manner. Each rotation cycle has K frames. In each kth frame, a kth one of the K complementary pairs of switching control signals is actuated (e.g., turned ON, closed, etc.), thereby effectively closing the kth switch of each of the K switching networks 1120. For example, in each first frame, switching transistors Ps1 and Ns1 are actuated in all K switching networks 1120; in each second frame, switching transistors Ps2 and Ns2 are actuated in all K switching networks 1120; etc. The result is that, for example, the first sinusoidal branch current 935a corresponds to the first sinusoidal input current 933a in each first frame, to the second sinusoidal input current 933b in each second frame, to the third sinusoidal input current 933c in each third frame, etc. Correspondingly, the second sinusoidal branch current 935b corresponds to the second sinusoidal input current 933b in each first frame, to the third sinusoidal input current 933c in each second frame, to the fourth sinusoidal input current 933d in each third frame, etc.; and the Kth sinusoidal branch current 935k corresponds to the Kth sinusoidal input current 933k in each first frame, to the first sinusoidal input current 933a in each second frame, to the second sinusoidal input current 933b in each third frame, etc.

As described above, embodiments of the multi-branch AC-mode bridge, such as those of FIG. 9, can couple with a channel set 901 of K channels. In some implementations, the channel set 901 includes all touch sense channels of the touch panel array. In other implementations, some or all of the touch sense channels are grouped into multiple channel sets 901. For example, X*K touch sense channels can be grouped into X channel sets 901, each being a disjoint set of K channels. Alternatively, different channel sets 901 can include different numbers of channels.

Several approaches can be used to support multiple channel sets 901. One approach is to implement an instance of the multi-branch AC-mode bridge (e.g., any of the architectures described with reference to FIGS. 9-12) for each channel set 901. For example, each instance of the multi-branch AC-mode bridge generates a respective K sinusoidal branch currents 935 for a respective K branches coupled with its respective channel set 901 of K touch sense channels based on feedback (i.e., Vchf 925) from one or more of its respective K branches. Other approaches can share feedback between multiple instances of the multi-branch AC-mode bridge, distribute components (e.g., error amplifiers 920) over an instance of the multi-branch AC-mode bridge, etc.

Figure 13:
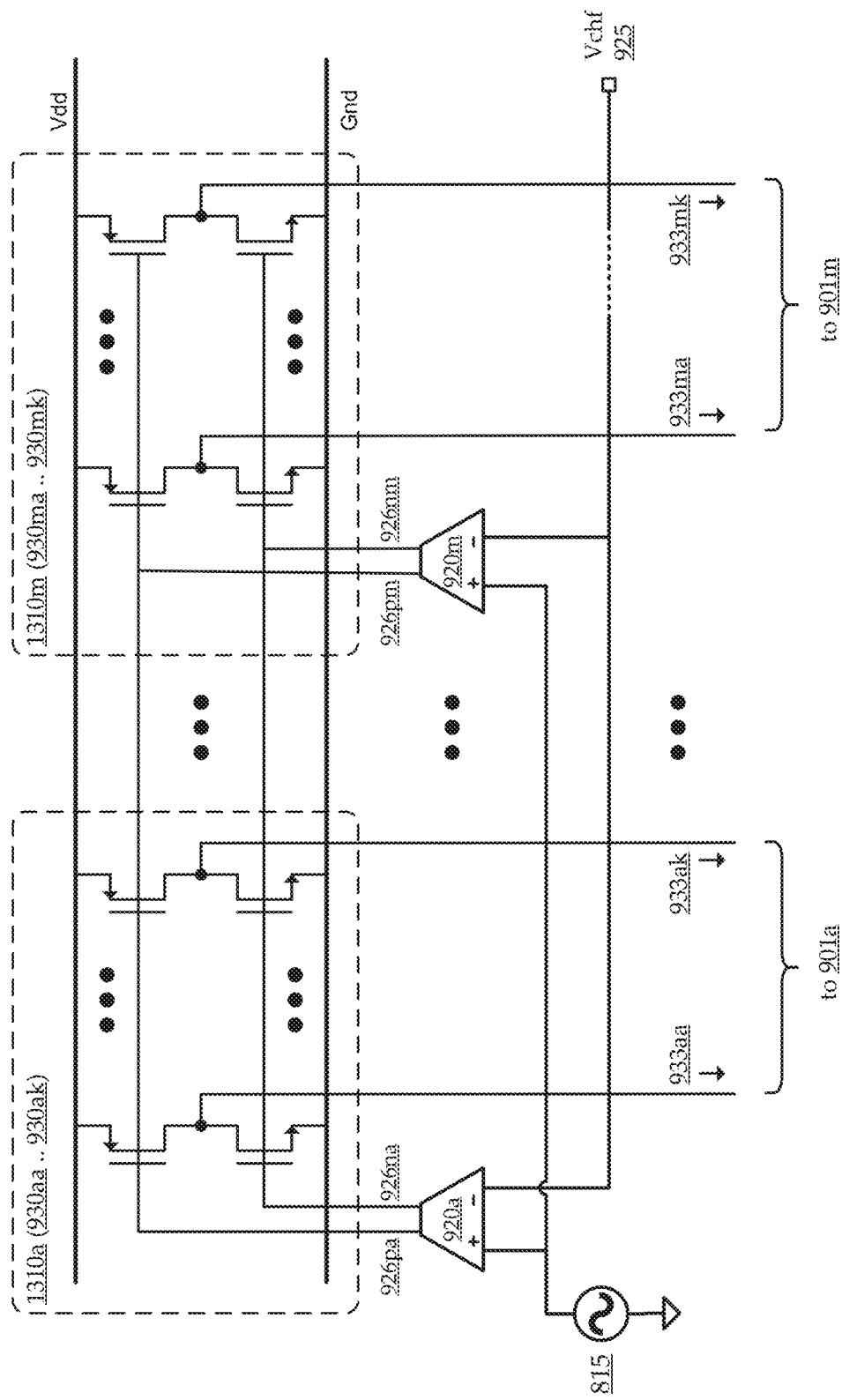
FIG. 13 shows a circuit block diagram of a partial alternative implementation of a multi-branch AC-mode bridge with distributed error amplifiers.

For example, FIG. 13 shows a circuit block diagram of a partial alternative implementation of a multi-branch AC-mode bridge with distributed error amplifiers 920. As illustrated, a single multi-branch AC-mode bridge is implemented to perform capacitive touch sensing for M channel sets 901 (labeled 901a-901m), each having K channels. The multi-branch AC-mode bridge includes M current source sets 1310 (labeled 1310a-1310m), each having K nominally identical adjustable current sources 930 (labeled 930aa-930ak for the first current source set 1310a, labeled 930ma-930mk for the Mth current source set 1310m, etc.

Each current source set 1310 is controlled by the output of a respective one of M error amplifiers 920 (labeled (920a-920m), and all of the M error amplifiers 920 are fed by a shared sinusoidal voltage source 815 and a shared channel feedback signal, Vchf 925. As illustrated, each error amplifier 920 takes a sinusoidal driver signal from the sinusoidal voltage source 815 at its first input, takes Vchf 925 at its second input, and outputs a respective complementary pair of error signals 926p and 926n, accordingly. Each complementary pair includes a first (e.g., positive) error signal 926p and a second (e.g., negative) error signal 926n. The complementary pair of error signals 926p and 926n are labeled as 926pa and 926na at the output of the first error amplifier 920a, as 926pm and 926nm at the output of the Mth error amplifier 920m, etc. In the illustrated implementation, all of the first error signals 926p are coupled to a same first control line, and all of the second error signals 926n are coupled to a same second control line. All of the adjustable current sources 930 can be controlled based on the first and second control lines. For example, each adjustable current source 930 can be implemented as a complementary pair of PMOS and NMOS transistors, where the PMOS transistors are all driven by the first control line (i.e., by the first error signal 926p) and the NMOS transistors are all driven by the second control line (i.e., by the second error signal 926n).

In embodiments described herein, the error signal(s) 926 are generated by the error amplifier(s) 920 based on feedback of a feedback channel voltage, Vchf 925. In some embodiments, each error amplifier 920 receives a Vchf 925 generated from one of the K branches of the channel set 901 with which it is associated. In other embodiments, each error amplifier 920 receives a Vchf 925 generated from two or more of the K branches of its channel set 901. In other embodiments, each error amplifier 920 receives a Vchf 925 generated from one or more of the branches of all channel sets 901 of its multi-branch AC-mode bridge.

Figure 14:
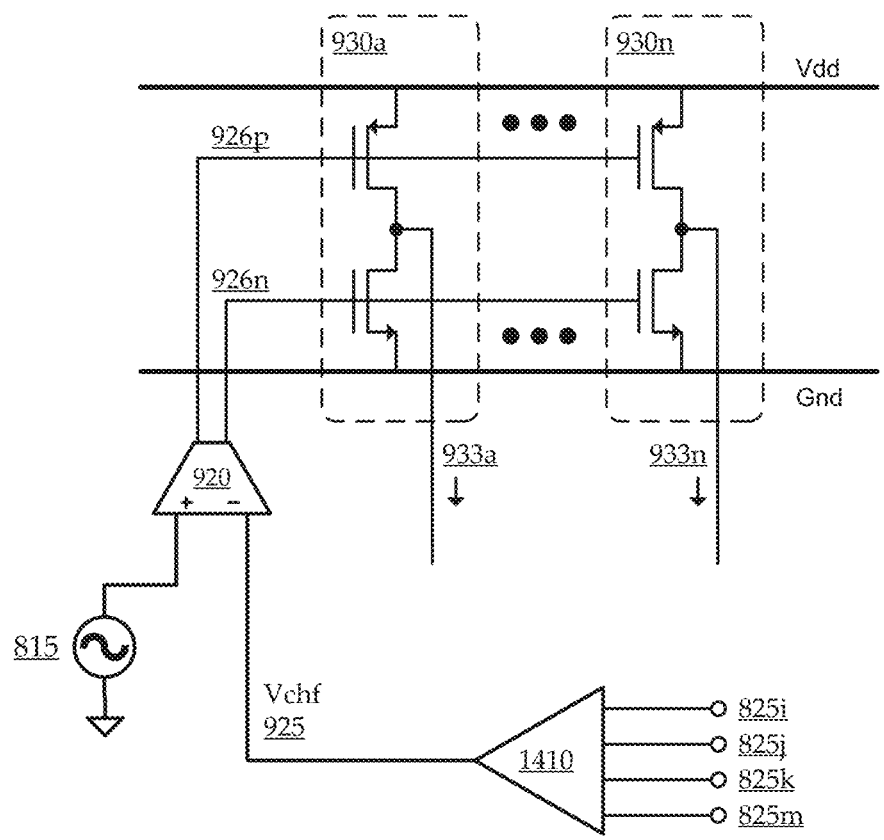
FIG. 14 shows a circuit block diagram of a partial implementation of a multi-branch AC-mode bridge with a feedback generator.

In some implementations, the Vchf 925 is "generated from" one or more branches by directly feeding back the branch voltage(s) 825 of the one or more branches. In other embodiments, the Vchf 925 is "generated from" one or more branches by performing one or more analog and/or digital operations on the branch voltage(s) 825, such as sampling, averaging, summing, etc. For example, FIG. 14 shows a circuit block diagram of a partial implementation of a multi-branch AC-mode bridge with a feedback generator 1410. For context, the circuit block diagram includes multiple adjustable current sources 930 that produce respective sinusoidal input currents 933 based on a complementary pair of error signals 926. The error signals 926 are generated by an error amplifier 920 based on a sinusoidal driver signal from a sinusoidal voltage source 815 and based on a feedback channel voltage, Vchf 925. The feedback generator can be an analog averaging amplifier that takes two or more branch voltages 825 at its inputs and generates an analog average of those branch voltages 825 at its output. Although the illustrated implementation shows the feedback generator 1410 averaging four branch voltages 825, alternative implementations of the feedback generator 1410 can average any suitable number of branch voltages 825 greater than two. As illustrated, the output of the feedback generator 1410 can be fed back to one or more error amplifiers 920 as Vchf 925.

Figure 15:
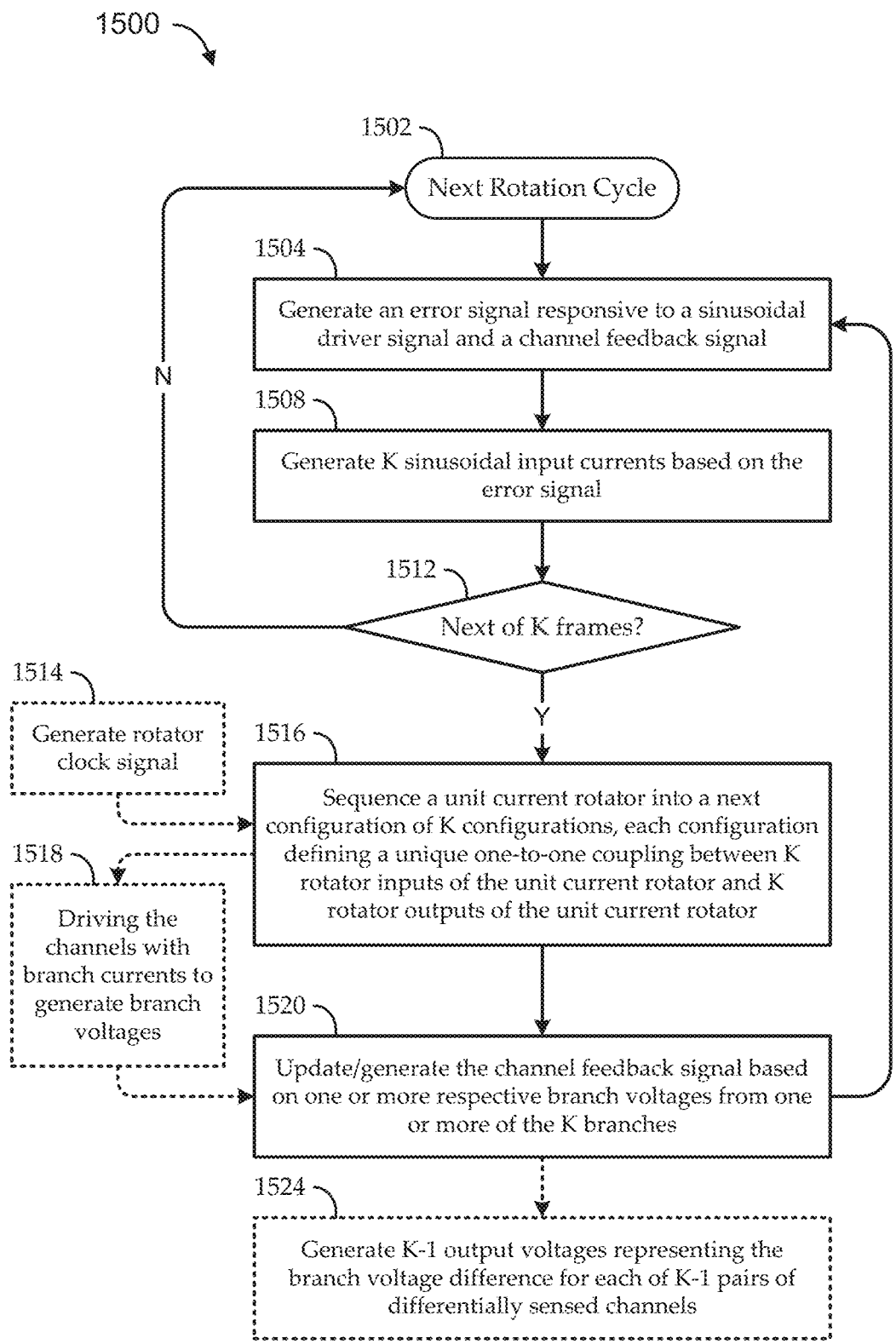
FIG. 15 shows a flow diagram of an illustrative method for self-capacitor sensing in a touch panel array, according to embodiments described herein.

FIG. 15 shows a flow diagram of an illustrative method 1500 for self-capacitor sensing in a touch panel array, according to embodiments described herein. The method 1500 can represent concurrent differential readout of multiple channels using a multi-branch AC-mode bridge that includes a unit current rotator. As described herein, embodiments operate in context of a touch panel array integrated with a display panel. The touch panel array has multiple channels (e.g., touch sense channels, such as row lines and/or column lines). Each channel has a respective channel self-capacitance (Ci) that includes a respective base self-capacitance (Cs) corresponding to display noise capacitively coupled onto the channel from the display panel and a respective touch capacitance (Ctouch) that changes responsive to presence of a touch event local to the channel.

As described herein, operation of the multi-branch AC-mode bridge involves cycling the unit current rotator through K frames of a rotator cycle. For example, as illustrated, each rotator cycle can begin at stage 1502 and can proceed through some or all of stages 1504-1524, including iterating through at least a portion of the stages (e.g., at least stages 1516 and 1520) K times to implement the K frames. Timing of the rotator cycle can be appreciably faster than a single readout cycle, such that the method 1500 may be performed many times in a row during (i.e., many rotation cycles may be performed) during each readout cycle of corresponding channels of the touch panel array.

Each rotation cycle can include, at stage 1504, generating an error signal responsive to a sinusoidal driver signal and a channel feedback signal. At stage 1508, embodiments can generate K sinusoidal input currents based on the error signal. K is an integer greater than two (i.e., three or more). The K sinusoidal input currents can be nominally identical, such as generated by nominally identical adjustable current sources.

At stage 1512, a determination can be made as to whether more frames remain for the current rotation cycle. For example, each rotation cycle includes cycling through K frames, and each iteration past stage 1512 can be considered as a kth iteration corresponding to the kth frame. If no more frames remain (i.e., the preceding iteration was already the Kth iteration), the method 1500 can return to stage 1502 to begin another rotation cycle. In such a case, the iteration count is reset to support another cycle of K iterations.

At stage 1516, embodiments can sequence a unit current rotator into a next (i.e., kth) configuration of K configurations, each configuration defining a unique one-to-one coupling between K rotator inputs of the unit current rotator and K rotator outputs of the unit current rotator. Each of the K rotator inputs is coupled with a respective one of the K sinusoidal input currents, each of the K rotator outputs is coupled with a respective one of K branches, and each of the K branches is to couple with a respective touch sense channel of the touch panel array. As such, each unique one-to-one coupling is defined, so that each of the K branches receives a respective sinusoidal branch current that is sourced by each of the K sinusoidal input currents for 1/Kth of each rotation cycle.

In some embodiments, at stage 1514, a rotator clock signal is generated by a clock generator. In such embodiments, the sequencing at stage 1516 is according to the rotator clock signal. In some embodiments, the sequencing at stage 1516 includes generating a switching control signal that changes in each of the K frames; and controlling K switching networks using the switching control signal, each of the K switching networks configured to couple a respective one of the K rotator inputs to a selected one of the K rotator outputs based on the switching control signal. In some such embodiments, each kth switching network is coupled, via a kth rotator input of the K rotator inputs, with a kth adjustable current source of the K adjustable current sources to receive a kth sinusoidal input current of the K sinusoidal input currents; and each of the K switching networks comprises K switches, each coupled with a respective one of the K rotator outputs and selectively actuated based on the switching control signal, such that each kth switch of each kth switching network is configured to selectively couple the kth sinusoidal input current with its respective one of the K rotator outputs during one of the K frames of each rotation cycle. In some such embodiments, the generating the switching control signal comprises generating K complementary pairs of switching control signals; and each kth switch of each of the K switching networks is implemented as a respective kth complementary pair of PMOS and NMOS switching transistors controlled by a kth complementary pair of switching control signals of the K complementary pairs of switching control signals.

At stage 1520, embodiments can update the channel feedback signal based on one or more respective branch voltages from one or more of the K branches. The one or more respective branch voltages arise on the one or more of the K branches responsive to the respective sinusoidal branch current on the one or more of the K branches. In some embodiments, at stage 1518, each respective branch voltage is generated by using the respective sinusoidal branch current to drive the respective touch sense channel coupled therewith. In some embodiments, the updating at stage 1520 includes generating (e.g., deriving, etc.) the channel feedback signal. For example, the channel feedback signal can be generated based on an average (e.g., an analog average) of the branch voltages from two or more of the K branches.

Some embodiments continue at stage 1524 by generating, by each of K−1 output amplifiers, a respective output voltage based on a difference between respective branch voltages of a respective two of the K branches coupled thereto. As described herein, although the method 1500 is described with respect to K branches, K channels, etc.; embodiments can be configured so that the K branches, channels, etc. represent one of multiple sets supported by the multi-branch AC-mode bridge. For example, in some embodiments, the K branches are one of M sets of K branches, each set of K branches to couple with a respective one of M channel sets, each channel set being a disjoint set of K touch sense channels of the touch panel array, M being an integer greater than one; generating the error signal at stage 1504 comprises generating M error signals responsive to the sinusoidal driver signal and the channel feedback signal; and the K sinusoidal input currents generated at stage 1508 are one of M sets of K sinusoidal input currents, each generated for a respective one of the M sets of K branches based on a respective one of the M error signals.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A multi-branch alternating-current-mode (AC-mode) bridge for self-capacitor sensing, the multi-branch AC-mode bridge comprising:
   K branches, each to couple with a respective one of a plurality of touch sense channels of a touch panel array integrated with a display panel, K being an integer greater than two;
   K adjustable current sources, each to output a respective one of K sinusoidal input currents based on an error signal;
   a unit current rotator having K rotator inputs and K rotator outputs, each of the K rotator inputs coupled with a respective one of the K sinusoidal input currents, each of the K rotator outputs coupled with a respective one of the K branches, the unit current rotator configured to cycle repeatedly through a sequence of K frames of a rotation cycle, each frame defining a unique set of one-to-one couplings between the K rotator outputs and the K rotator inputs, such that each of the K branches receives a respective sinusoidal branch current that is sourced by each of the K sinusoidal input currents for 1/Kth of each rotation cycle; and
   an error amplifier to generate the error signal responsive to a sinusoidal driver signal and a channel feedback signal,
   wherein each of the K branches manifests a respective branch voltage responsive to its respective sinusoidal branch current, and the channel feedback signal is based on the respective branch voltage from one or more of the K branches.

2. The multi-branch AC-mode bridge of claim 1, further comprising:
   a clock generator to output a rotator clock signal,
   wherein the unit current rotator is configured to cycle repeatedly through the sequence of K frames based on the rotator clock signal.

3. The multi-branch AC-mode bridge of claim 1, further comprising:
   K−1 output amplifiers, each coupled between a respective two of the K branches to generate a respective output voltage based on a difference between the respective branch voltages of the respective two of the K branches.

4. The multi-branch AC-mode bridge of claim 1, wherein, for each of the K branches:
   the respective branch voltage manifests from driving the respective touch sense channel of the branch with the respective sinusoidal branch current, each respective touch sense channel having a respective channel self-capacitance including: a respective base self-capacitance arising from display noise capacitively coupled onto the respective touch sense channel; and a respective touch capacitance that changes responsive to presence of a touch event local to the respective touch sense channel.

5. The multi-branch AC-mode bridge of claim 1, wherein each of the adjustable current sources comprises a nominally identical complementary pair of PMOS and NMOS transistors.

6. The multi-branch AC-mode bridge of claim 1, wherein the unit current rotator comprises:

a rotator controller that generates a switching control signal, the switching control signal changing in each of the K frames; and K switching networks, each configured to couple a respective one of the K rotator inputs to a selected one of the K rotator outputs based on the switching control signal.

7. The multi-branch AC-mode bridge of claim 6, wherein:

each kth switching network is coupled, via a kth rotator input of the K rotator inputs, with a kth adjustable current source of the K adjustable current sources to receive a kth sinusoidal input current of the K sinusoidal input currents; and each of the K switching networks comprises K switches, each coupled with a respective one of the K rotator outputs and selectively actuated based on the switching control signal, such that each kth switch of each kth switching network is configured to selectively couple the kth sinusoidal input current with its respective one of the K rotator outputs during one of the K frames of each rotation cycle.

8. The multi-branch AC-mode bridge of claim 7, wherein:

the switching control signal is generated as K complementary pairs of switching control signals; and each kth switch of each of the K switching networks is implemented as a respective kth complementary pair of PMOS and NMOS switching transistors controlled by a kth complementary pair of switching control signals of the K complementary pairs of switching control signals.

9. The multi-branch AC-mode bridge of claim 1, wherein:

the K branches are one of M sets of K branches, each set of K branches to couple with a respective one of M channel sets, each channel set being a disjoint set of K touch sense channels of the touch panel array, M being an integer greater than one;

the error amplifier is one of M error amplifiers, each to generate a respective one of M error signals responsive to the sinusoidal driver signal and the channel feedback signal; and the K adjustable current sources are one of M sets of K adjustable current sources, each of the M sets of K adjustable current sources to output a respective set of K sinusoidal input currents to a respective one of the M sets of K branches based on a respective one of the M error signals.

10. The multi-branch AC-mode bridge of claim 1, further comprising:

a feedback generator to generate the channel feedback signal based on an average of the branch voltages from two or more of the K branches.

11. A system comprising:

the touch panel array having the plurality of touch sense channels and integrated with the display; and at least one instance of the multi-branch AC-mode bridge of claim 1, each branch of each at least one instance of the multi-branch AC-mode bridge being coupled with a respective one of the plurality of touch sense channels of the touch panel array.

12. A method for self-capacitor sensing in a touch panel array integrated with a display panel, the method comprising:

generating an error signal responsive to a sinusoidal driver signal and a channel feedback signal;

generating K sinusoidal input currents based on the error signal, the K sinusoidal input currents being nominally identical, K being an integer greater than two;

for each of a plurality of rotation cycles, cycling through K frames by, for each kth frame:

sequencing a unit current rotator into a kth configuration of K configurations, each configuration defining a unique one-to-one coupling between K rotator inputs of the unit current rotator and K rotator outputs of the unit current rotator, wherein each of the K rotator inputs is coupled with a respective one of the K sinusoidal input currents, and each of the K rotator outputs is coupled with a respective one of K branches, each of the K branches to couple with a respective one of a plurality of touch sense channels of the touch panel array, such that each of the K branches receives a respective sinusoidal branch current that is sourced by each of the K sinusoidal input currents for 1/Kth of each rotation cycle; and updating the channel feedback signal based on one or more respective branch voltages from one or more of the K branches, the one or more respective branch voltages arising on the one or more of the K branches responsive to the respective sinusoidal branch current on the one or more of the K branches.

13. The method of claim 12, further comprising:

generating a rotator clock signal by a clock generator, wherein the sequencing is according to the rotator clock signal.

14. The method of claim 12, further comprising:

generating, by each of K−1 output amplifiers, a respective output voltage based on a difference between respective branch voltages of a respective two of the K branches coupled thereto.

15. The method of claim 12, further comprising, for each of the K branches:

generating the respective branch voltage by using the respective sinusoidal branch current to drive the respective touch sense channel coupled therewith, each respective touch sense channel having a respective channel self-capacitance including: a respective base self-capacitance arising from display noise capacitively coupled onto the respective touch sense channel; and a respective touch capacitance that changes responsive to presence of a touch event local to the respective touch sense channel.

16. The method of claim 12, wherein the sequencing comprises:

generating a switching control signal that changes in each of the K frames; and controlling K switching networks using the switching control signal, each of the K switching networks configured to couple a respective one of the K rotator inputs to a selected one of the K rotator outputs based on the switching control signal.

17. The method of claim 16, wherein:

each kth switching network is coupled, via a kth rotator input of the K rotator inputs, with a kth adjustable current source of the K adjustable current sources to receive a kth sinusoidal input current of the K sinusoidal input currents; and each of the K switching networks comprises K switches, each coupled with a respective one of the K rotator outputs and selectively actuated based on the switching control signal, such that each kth switch of each kth switching network is configured to selectively couple the kth sinusoidal input current with its respective one of the K rotator outputs during one of the K frames of each rotation cycle.

18. The method of claim 17, wherein:

the generating the switching control signal comprises generating K complementary pairs of switching control signals; and each kth switch of each of the K switching networks is implemented as a respective kth complementary pair of PMOS and NMOS switching transistors controlled by a kth complementary pair of switching control signals of the K complementary pairs of switching control signals.

19. The method of claim 12, wherein:

the K branches are one of M sets of K branches, each set of K branches to couple with a respective one of M channel sets, each channel set being a disjoint set of K touch sense channels of the touch panel array, M being an integer greater than one;

generating the error signal comprises generating M error signals responsive to the sinusoidal driver signal and the channel feedback signal; and the K sinusoidal input currents are one of M sets of K sinusoidal input currents, each generated for a respective one of the M sets of K branches based on a respective one of the M error signals.

20. The method of claim 12, further comprising:

generating the channel feedback signal based on an average of the branch voltages from two or more of the K branches.

* * * * *